United States Patent
Huang et al.

(10) Patent No.: US 10,587,385 B2
(45) Date of Patent: Mar. 10, 2020

(54) TECHNIQUES AND APPARATUSES FOR ACKNOWLEDGEMENT (ACK) / NEGATIVE ACKNOWLEDGEMENT (NACK) SIGNALING USING A REFERENCE SIGNAL

(71) Applicant: QUALCOMM Incorporated, San Diego, CA (US)

(72) Inventors: Yi Huang, San Diego, CA (US); Xiaoxia Zhang, San Diego, CA (US); Renqiu Wang, San Diego, CA (US); Hao Xu, Beijing (CN); Peter Gaal, San Diego, CA (US); Seyong Park, San Diego, CA (US); Sony Akkarakaran, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/980,571

(22) Filed: May 15, 2018

(65) Prior Publication Data

US 2018/0367284 A1    Dec. 20, 2018

Related U.S. Application Data

(60) Provisional application No. 62/520,330, filed on Jun. 15, 2017.

(51) Int. Cl.
*H04L 5/00* (2006.01)
*H04L 1/16* (2006.01)
*H04L 27/26* (2006.01)
*H04W 72/04* (2009.01)

(52) U.S. Cl.
CPC .......... *H04L 5/0055* (2013.01); *H04L 1/1664* (2013.01); *H04L 1/1671* (2013.01); *H04L 5/0051* (2013.01); *H04L 27/2613* (2013.01); *H04L 1/1614* (2013.01); *H04W 72/0413* (2013.01)

(58) Field of Classification Search
CPC ................................. H04W 72/0413
See application file for complete search history.

(56) References Cited

U.S. PATENT DOCUMENTS

| | | | |
|---|---|---|---|
| 2007/0183384 A1* | 8/2007 | Kwak | H04L 5/0055 370/338 |
| 2011/0211510 A1 | 9/2011 | Kim et al. | |
| 2012/0051245 A1* | 3/2012 | Nam | H04L 1/1671 370/252 |
| 2012/0082079 A1 | 4/2012 | Luo et al. | |

(Continued)

OTHER PUBLICATIONS

International Search Report and Written Opinion—PCT/US2018/032960—ISA/EPO—dated Aug. 6, 2018.

*Primary Examiner* — Jamaal Henson
(74) *Attorney, Agent, or Firm* — Nerrie M. Zohn

(57) ABSTRACT

Techniques described herein assist with indicating whether ACK/NACK signaling is present in an uplink transmission, thereby enhancing performance by permitting use of rate matching while reducing decoding errors. For example, a user equipment may determine whether ACK/NACK signaling is to be included in an uplink transmission in a portion of uplink resources allocated for a data channel, may generate a reference signal that indicates whether the ACK/NACK signaling is present in the uplink transmission, and may transmit the reference signal.

30 Claims, 13 Drawing Sheets

(56) References Cited

U.S. PATENT DOCUMENTS

| | | | |
|---|---|---|---|
| 2012/0243497 A1 | 9/2012 | Chung et al. | |
| 2015/0326368 A1* | 11/2015 | Kwak | H04L 5/0055 |
| | | | 370/336 |
| 2016/0174213 A1* | 6/2016 | Webb | H04L 5/0051 |
| | | | 370/336 |
| 2018/0206225 A1* | 7/2018 | Li | H04L 1/1671 |
| 2018/0316464 A1* | 11/2018 | Stern-Berkowitz | |
| | | | H04L 1/0034 |

* cited by examiner

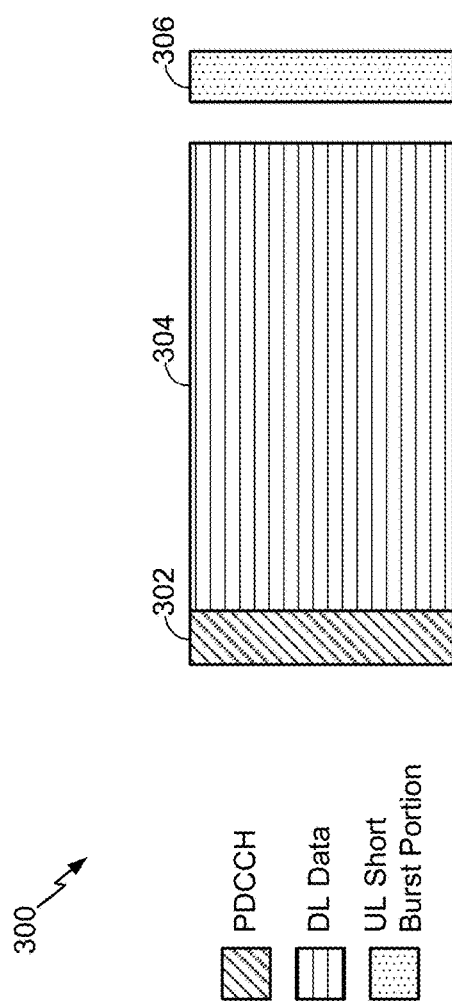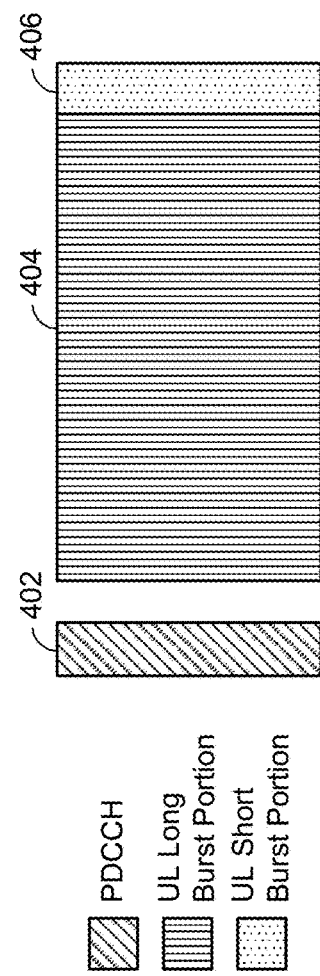
FIG. 3
FIG. 4

TECHNIQUES AND APPARATUSES FOR ACKNOWLEDGEMENT (ACK) / NEGATIVE ACKNOWLEDGEMENT (NACK) SIGNALING USING A REFERENCE SIGNAL

CROSS-REFERENCE TO RELATED APPLICATIONS UNDER 35 U.S.C. § 119

This application claims priority to U.S. Provisional Patent Application No. 62/520,330, filed on Jun. 15, 2017, entitled "TECHNIQUES AND APPARATUSES FOR ACKNOWLEDGEMENT (ACK)/NEGATIVE ACKNOWLEDGEMENT (NACK) SIGNALING USING A REFERENCE SIGNAL," which is hereby expressly incorporated by reference herein.

BACKGROUND

Field

Aspects of the present disclosure generally relate to wireless communication, and more particularly to techniques and apparatuses for acknowledgement or negative acknowledgement (ACK/NACK) signaling using a reference signal.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a 5G Node B, and/or the like.

The above multiple access technologies have been adopted in various telecommunication standards to provide a common protocol that enables different wireless communication devices to communicate on a municipal, national, regional, and even global level. 5G, which may also be referred to as New radio (NR), is a set of enhancements to the LTE mobile standard promulgated by the Third Generation Partnership Project (3GPP). 5G is designed to better support mobile broadband Internet access by improving spectral efficiency, lowering costs, improving services, making use of new spectrum, and better integrating with other open standards using OFDM with a cyclic prefix (CP) (CP-OFDM) on the downlink (DL), using CP-OFDM and/or SC-FDM (e.g., also known as discrete Fourier transform spread ODFM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and 5G technologies. Preferably, these improvements should be applicable to other multiple access technologies and the telecommunication standards that employ these technologies.

SUMMARY

When multiplexing control communications and data communications, a UE may puncture uplink data with ACK/NACK signaling to reduce decoding errors. However, in some radio access technologies, such as 5G, puncturing uplink data with ACK/NACK signaling may cause a large performance degradation when the ACK/NACK signaling has a large payload size (e.g., due to ACK/NACK signaling for carrier aggregation, for multiple code block groups, and/or the like). With a large ACK/NACK signaling payload size, rate matching the ACK/NACK signaling around the uplink data may lead to better performance (e.g., throughput, delay, and/or the like) than puncturing the uplink data with the ACK/NACK signaling. However, as indicated above, rate matching the ACK/NACK signaling around the uplink data may lead to decoding errors when the base station does not have information regarding whether to expect receipt of the ACK/NACK signaling.

Some techniques and apparatuses described herein assist with indicating, to a base station, whether ACK/NACK signaling is present in an uplink transmission, thereby enhancing performance by permitting use of rate matching while reducing decoding errors. For example, a user equipment may determine whether ACK/NACK signaling is to be included in an uplink transmission in a portion of uplink resources allocated for a data channel, may generate a reference signal that indicates whether the ACK/NACK signaling is present in the uplink transmission, and may transmit the reference signal. In some aspects, the reference signal is modulated to indicate whether the ACK/NACK signaling is present in the uplink transmission. In some aspects, one or more cyclic shifts or one or more phase rampings of the reference signal indicate whether the ACK/NACK signaling is present in the uplink transmission.

In an aspect of the disclosure, a method, a device, an apparatus, and a computer program product are provided.

In some aspects, the method may include determining, by a user equipment (UE), whether acknowledgement or negative acknowledgement (ACK/NACK) signaling is to be included in an uplink transmission in a portion of uplink resources allocated for a data channel; generating, by the UE, a reference signal that indicates whether the ACK/NACK signaling is present in the uplink transmission; and transmitting, by the UE, the reference signal that indicates whether the ACK/NACK signaling is present in the uplink transmission.

In some aspects, the method may include receiving, by a base station, a reference signal that indicates whether ACK/NACK signaling is present in an uplink transmission in a portion of uplink resources allocated for a data channel; determining, by the base station, whether the ACK/NACK signaling was received in the uplink transmission based at least in part on the reference signal; and decoding, by the base station, the ACK/NACK signaling when the ACK/NACK signaling is received.

In some aspects, the device may include memory one or more processors coupled to the memory. The memory and the one or more processors may be configured to determine whether ACK/NACK signaling is to be included in an uplink transmission in a portion of uplink resources allocated for a data channel; generate a reference signal that indicates whether the ACK/NACK signaling is present in the uplink transmission; and transmit the reference signal that indicates whether the ACK/NACK signaling is present in the uplink transmission.

In some aspects, the device may include memory one or more processors coupled to the memory. The memory and the one or more processors may be configured to receive a reference signal that indicates whether ACK/NACK signaling is present in an uplink transmission in a portion of uplink resources allocated for a data channel; determine whether the ACK/NACK signaling was received in the uplink transmission based at least in part on the reference signal; and decode the ACK/NACK signaling when the ACK/NACK signaling is received.

In some aspects, the apparatus may include means for determining whether ACK/NACK signaling is to be included in an uplink transmission in a portion of uplink resources allocated for a data channel; means for generating a reference signal that indicates whether the ACK/NACK signaling is present in the uplink transmission; and means for transmitting the reference signal that indicates whether the ACK/NACK signaling is present in the uplink transmission.

In some aspects, the apparatus may include means for receiving a reference signal that indicates whether ACK/NACK signaling is present in an uplink transmission in a portion of uplink resources allocated for a data channel; means for determining whether the ACK/NACK signaling was received in the uplink transmission based at least in part on the reference signal; and means for decoding the ACK/NACK signaling when the ACK/NACK signaling is received.

In some aspects, the computer program product may include non-transitory computer-readable medium storing one or more instructions for wireless communication. The one or more instructions, when executed by one or more processors, may cause the one or more processors to determine whether ACK/NACK signaling is to be included in an uplink transmission in a portion of uplink resources allocated for a data channel; generate a reference signal that indicates whether the ACK/NACK signaling is present in the uplink transmission; and transmit the reference signal that indicates whether the ACK/NACK signaling is present in the uplink transmission.

In some aspects, the computer program product may include non-transitory computer-readable medium storing one or more instructions for wireless communication. The one or more instructions, when executed by one or more processors, may cause the one or more processors to receive a reference signal that indicates whether ACK/NACK signaling is present in an uplink transmission in a portion of uplink resources allocated for a data channel; determine whether the ACK/NACK signaling was received in the uplink transmission based at least in part on the reference signal; and decode the ACK/NACK signaling when the ACK/NACK signaling is received.

Aspects generally include a method, apparatus, system, computer program product, non-transitory computer-readable medium, user equipment, base station, wireless communication device, and processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

FIG. 3 is a diagram illustrating an example of a downlink (DL)-centric wireless communication structure.

FIG. 4 is a diagram illustrating an example of an uplink (UL)-centric wireless communication structure.

DETAILED DESCRIPTION

Figure 1:
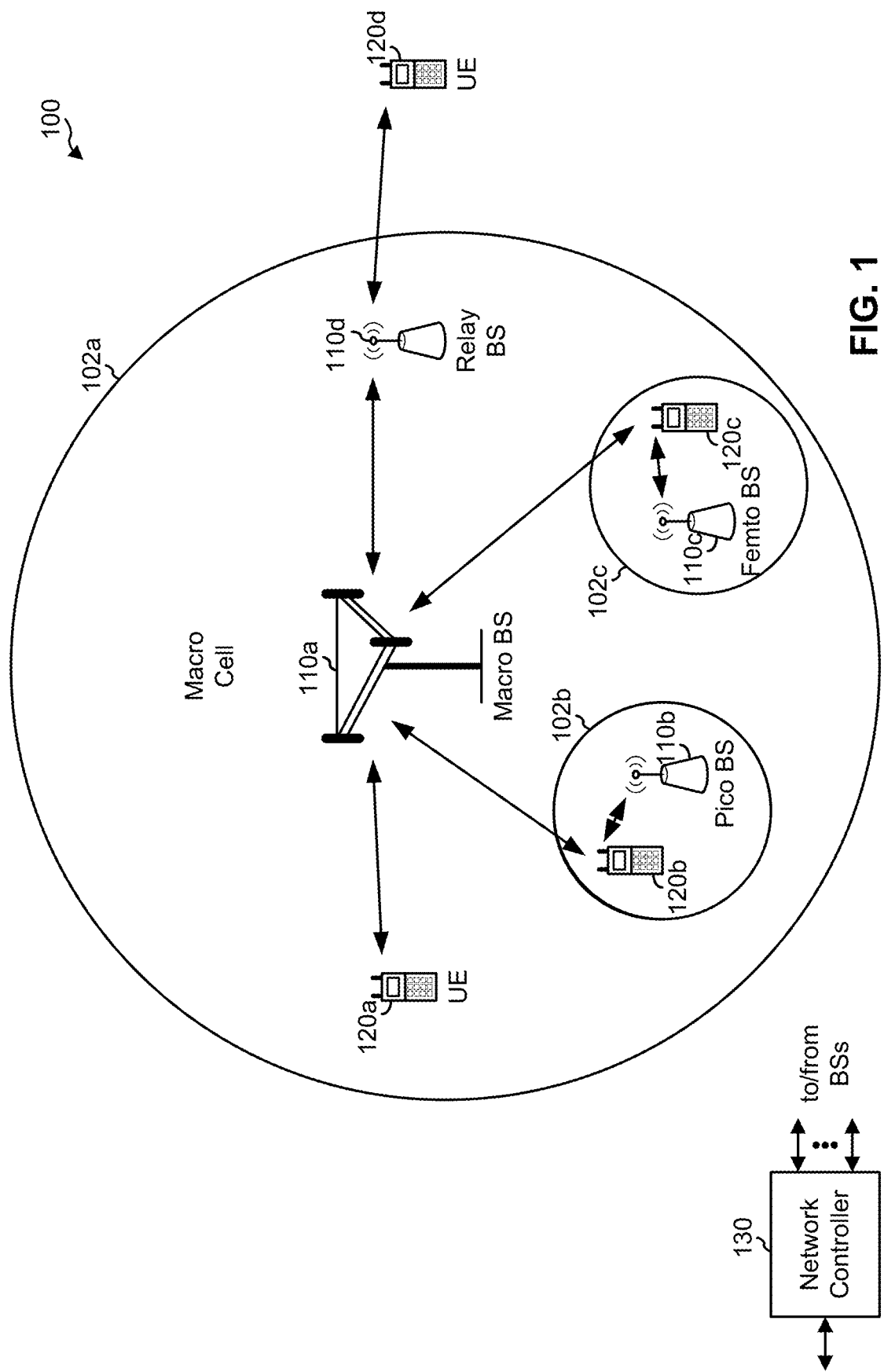
FIG. 1 is diagram illustrating an example of a wireless communication network.

The detailed description set forth below in connection with the appended drawings is intended as a description of various configurations and is not intended to represent the configurations in which the concepts described herein may be practiced. The detailed description includes specific details for the purposes of providing a thorough understanding of various concepts. However, it will be apparent to those skilled in the art that these concepts may be practiced without these specific details. In some instances, well-known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, and/or the like (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, and/or the like, whether referred to as software, firmware, middleware, microcode, hardware description language, or otherwise.

Accordingly, in one or more example embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), compact disk ROM (CD-ROM) or other optical disk storage, magnetic disk storage or other magnetic storage devices, combinations of the aforementioned types of computer-readable media, or any other medium that can be used to store computer executable code in the form of instructions or data structures that can be accessed by a computer.

An access point ("AP") may comprise, be implemented as, or known as a NodeB, a Radio Network Controller ("RNC"), an eNodeB (eNB), a Base Station Controller ("BSC"), a Base Transceiver Station ("BTS"), a Base Station ("BS"), a Transceiver Function ("TF"), a Radio Router, a Radio Transceiver, a Basic Service Set ("BSS"), an Extended Service Set ("ESS"), a Radio Base Station ("RBS"), a Node B (NB), a gNB, a 5G NB, a Transmit Receive Point (TRP), or some other terminology.

An access terminal ("AT") may comprise, be implemented as, or be known as an access terminal, a subscriber station, a subscriber unit, a mobile station, a remote station, a remote terminal, a user terminal, a user agent, a user device, user equipment (UE), a user station, a wireless node, or some other terminology. In some aspects, an access terminal may comprise a cellular telephone, a smart phone, a cordless telephone, a Session Initiation Protocol ("SIP") phone, a wireless local loop ("WLL") station, a personal digital assistant ("PDA"), a tablet, a netbook, a smartbook, an ultrabook, a handheld device having wireless connection capability, a Station ("STA"), or some other suitable processing device connected to a wireless modem. Accordingly, one or more aspects taught herein may be incorporated into a phone (e.g., a cellular phone, a smart phone), a computer (e.g., a desktop), a portable communication device, a portable computing device (e.g., a laptop, a personal data assistant, a tablet, a netbook, a smartbook, an ultrabook), wearable device (e.g., smart watch, smart glasses, smart bracelet, smart wristband, smart ring, smart clothing, and/or the like), medical devices or equipment, biometric sensors/devices, an entertainment device (e.g., music device, video device, satellite radio, gaming device, and/or the like), a vehicular component or sensor, smart meters/sensors, industrial manufacturing equipment, a global positioning system device, or any other suitable device that is configured to communicate via a wireless or wired medium. In some aspects, the node is a wireless node. A wireless node may provide, for example, connectivity for or to a network (e.g., a wide area network such as the Internet or a cellular network) via a wired or wireless communication link.

Some UEs may be considered machine-type communication (MTC) UEs, which may include remote devices that may communicate with a base station, another remote device, or some other entity. Machine type communications (MTC) may refer to communication involving at least one remote device on at least one end of the communication and may include forms of data communication which involve one or more entities that do not necessarily need human interaction. MTC UEs may include UEs that are capable of MTC communications with MTC servers and/or other MTC devices through Public Land Mobile Networks (PLMN), for example. Examples of MTC devices include sensors, meters, location tags, monitors, drones, robots/robotic devices, and/or the like. In some aspects, MTC devices may be referred to as enhanced MTC (eMTC) devices, LTE category M1 (LTE-M) devices, machine to machine (M2M) devices, and/or the like. Additionally, or alternatively, some UEs may be narrowband Internet of things (NB-IoT) devices.

It is noted that while aspects may be described herein using terminology commonly associated with 3G and/or 4G wireless technologies, aspects of the present disclosure can be applied in other generation-based communication systems, such as 5G and later, including 5G technologies.

FIG. 1 is a diagram illustrating a network 100 in which aspects of the present disclosure may be practiced. The network 100 may be an LTE network or some other wireless network, such as a 5G network. Wireless network 100 may include a number of BSs 110 (shown as BS 110a, BS 110b, BS 110c, and BS 110d) and other network entities. A BS is an entity that communicates with user equipment (UEs) and may also be referred to as a base station, a Node B, a gNB, a 5G NB, an access point, a TRP, and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "gNB", "TRP", "AP", "node B", "5G NB", and "cell" may be used interchangeably herein.

In some examples, a cell may not necessarily be stationary, and the geographic area of the cell may move according to the location of a mobile BS. In some examples, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impact on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium. Some UEs may be considered evolved or enhanced machine-type communication (eMTC) UEs. MTC and eMTC UEs include, for example, robots, drones, remote devices, such as sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices. Some UEs may be considered a Customer Premises Equipment (CPE).

In some aspects, a UE 120 may use ACK/NACK signaling to indicate whether communications from a base station 110 were properly received and/or decoded by the UE 120. As described in more detail elsewhere herein, a UE 120 may determine whether ACK/NACK signaling is to be included in an uplink transmission in a portion of uplink resources allocated for a data channel, may generate a reference signal that indicates whether the ACK/NACK signaling is present in the uplink transmission, and may transmit the reference signal that indicates whether the ACK/NACK signaling is present in the uplink transmission. The base station 110 may receive the reference signal, may determine whether the ACK/NACK signaling was received in the uplink transmission based at least in part on the reference signal, and may decode the ACK/NACK signaling when the ACK/NACK signaling is received.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, 5G RAT networks may be deployed.

While aspects of the examples described herein may be associated with LTE technologies, aspects of the present disclosure may be applicable with other wireless communication systems, such as 5G technologies.

In some aspects, 5G may refer to radios configured to operate according to a new air interface (e.g., other than Orthogonal Frequency Divisional Multiple Access (OFDMA)-based air interfaces) or fixed transport layer (e.g., other than Internet Protocol (IP)). In aspects, 5G may utilize OFDM with a CP (herein referred to as cyclic prefix OFDM or CP-OFDM) and/or SC-FDM on the uplink, may utilize CP-OFDM on the downlink and include support for half-duplex operation using TDD. In aspects, 5G may, for example, utilize OFDM with a CP (herein referred to as CP-OFDM) and/or discrete Fourier transform spread orthogonal frequency-division multiplexing (DFT-s-OFDM) on the uplink, may utilize CP-OFDM on the downlink and include support for half-duplex operation using TDD. 5G may include Enhanced Mobile Broadband (eMBB) service targeting wide bandwidth (e.g., 80 megahertz (MHz) and beyond), millimeter wave (mmW) targeting high carrier frequency (e.g., 60 gigahertz (GHz)), massive MTC (mMTC) targeting non-backward compatible MTC techniques, and/or mission critical targeting ultra reliable low latency communications (URLLC) service.

A single component carrier bandwidth of 100 MHZ may be supported. 5G resource blocks may span 12 sub-carriers with a sub-carrier bandwidth of 75 kilohertz (kHz) over a 0.1 ms duration. Each radio frame may include 50 subframes with a length of 10 ms. Consequently, each subframe may have a length of 0.2 ms. Each subframe may indicate a link direction (e.g., DL or UL) for data transmission and the link direction for each subframe may be dynamically switched. Each subframe may include DL/UL data as well as DL/UL control data. UL and DL subframes for 5G may be as described in more detail below with respect to FIGS. 3 and 4.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, 5G may support a different air interface, other than an OFDM-based interface. 5G networks may include entities such central units or distributed units.

The RAN may include a central unit (CU) and distributed units (DUs). A 5G BS (e.g., gNB, 5G Node B, Node B, transmit receive point (TRP), access point (AP)) may correspond to one or multiple BSs. 5G cells can be configured as access cells (ACells) or data only cells (DCells). For example, the RAN (e.g., a central unit or distributed unit) can configure the cells. DCells may be cells used for carrier aggregation or dual connectivity, but not used for initial access, cell selection/reselection, or handover. In some cases, DCells may not transmit synchronization signals—in some case cases DCells may transmit SS. 5G BSs may transmit downlink signals to UEs indicating the cell type. Based at least in part on the cell type indication, the UE may communicate with the 5G BS. For example, the UE may determine 5G BSs to consider for cell selection, access, handover, and/or measurement based at least in part on the indicated cell type.

In some examples, access to the air interface may be scheduled, wherein a scheduling entity (e.g., a base station) allocates resources for communication among some or all devices and equipment within the scheduling entity's service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity.

Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

As indicated above, FIG. 1 is provided as an example. Other examples are possible and may differ from what was described with regard to FIG. 1.

Figure 2:
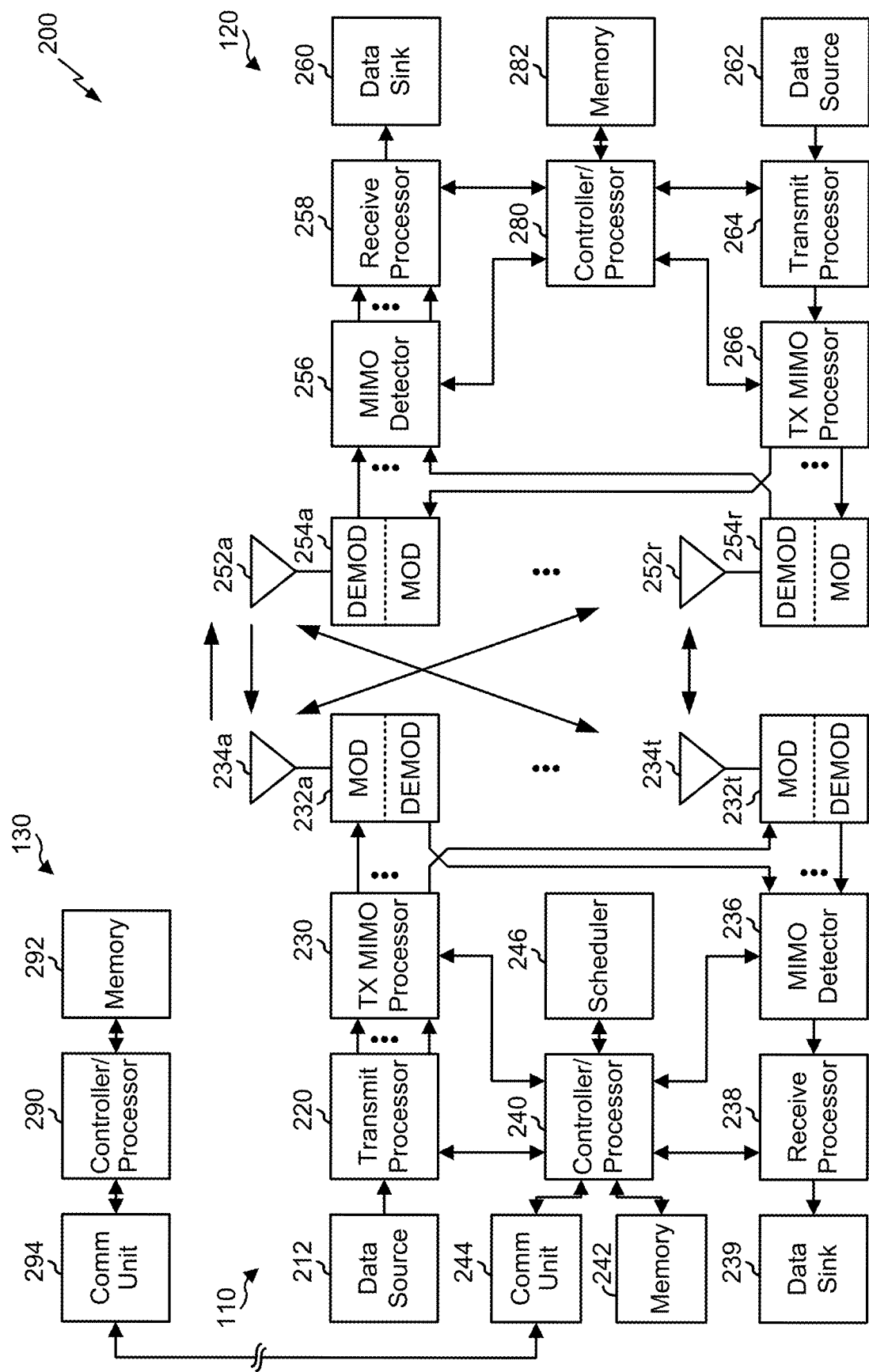
FIG. 2 is a diagram illustrating an example of a base station in communication with a user equipment (UE) in a wireless communication network.

FIG. 2 shows a block diagram 200 of a design of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI), and/or the like) and control information (e.g., CQI requests, grants, upper layer signaling, and/or the like) and provide overhead symbols and control symbols. Transmit processor 220 may also generate reference symbols for reference signals (e.g., the CRS) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to certain aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive (RX) processor 258 may process (e.g., demodulate and decode) the detected symbols, provide decoded data for UE 120 to a data sink 260, and provide decoded control information and system information to a controller/processor 280. A channel processor may determine RSRP, RSSI, RSRQ, CQI, and/or the like.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controllers/processors 240 and 280 and/or any other component(s) in FIG. 2 may direct the operation at base station 110 and UE 120, respectively, to perform acknowledgement or negative acknowledgement (ACK/NACK) signaling using a reference signal. For example, controller/processor 280 and/or other processors and modules at base station 110, may perform or direct operations of UE 120 to perform acknowledgement or negative acknowledgement (ACK/NACK) signaling using a reference signal. For example, controller/processor 280 and/or other controllers/processors and modules at BS 110 may perform or direct operations of, for example, method 800 of FIG. 8, method 900 of FIG. 9, and/or other methods as described herein. In some aspects, one or more of the components shown in FIG. 2 may be employed to perform example method 800 of FIG. 8, method 900 of FIG. 9, and/or other methods for the techniques described herein. Memories 242 and 282 may store data and program codes for BS 110 and UE 120, respectively. A scheduler 246 may schedule UEs for data transmission on the downlink and/or uplink.

As indicated above, FIG. 2 is provided as an example. Other examples are possible and may differ from what was described with regard to FIG. 2.

FIG. 3 is a diagram 300 showing an example of a DL-centric subframe or wireless communication structure. The DL-centric subframe may include a control portion 302. The control portion 302 may exist in the initial or beginning portion of the DL-centric subframe. The control portion 302 may include various scheduling information and/or control information corresponding to various portions of the DL-centric subframe. In some configurations, the control portion 302 may be a physical DL control channel (PDCCH), as indicated in FIG. 3.

The DL-centric subframe may also include a DL data portion 304. The DL data portion 304 may sometimes be referred to as the payload of the DL-centric subframe. The DL data portion 304 may include the communication resources utilized to communicate DL data from the scheduling entity (e.g., UE or BS) to the subordinate entity (e.g., UE). In some configurations, the DL data portion 304 may be a physical DL shared channel (PDSCH).

The DL-centric subframe may also include an UL short burst portion 306. The UL short burst portion 306 may sometimes be referred to as an UL burst, an UL burst portion, a common UL burst, a short burst, an UL short burst, a common UL short burst, a common UL short burst portion, and/or various other suitable terms. In some aspects, the UL short burst portion 306 may include one or more reference signals. Additionally, or alternatively, the UL short burst portion 306 may include feedback information corresponding to various other portions of the DL-centric subframe. For example, the UL short burst portion 306 may include feedback information corresponding to the control portion 302 and/or the data portion 304. Non-limiting examples of information that may be included in the UL short burst portion 306 include an ACK signal (e.g., a physical uplink control channel (PUCCH) ACK, a physical uplink shared channel (PUSCH) ACK, an immediate ACK), a NACK signal (e.g., a PUCCH NACK, a PUSCH NACK, an immediate NACK), a scheduling request (SR), a buffer status report (BSR), a HARQ indicator, a channel state indication (CSI), a channel quality indicator (CQI), a sounding reference signal (SRS), a demodulation reference signal (DMRS), PUSCH data, and/or various other suitable types of information. The UL short burst portion 306 may include additional or alternative information, such as information pertaining to random access channel (RACH) procedures, scheduling requests, and various other suitable types of information. In some aspects, a DMRS may be used to indicate whether ACK/NACK signaling is present in an uplink transmission, as described in more detail elsewhere herein.

As illustrated in FIG. 3, the end of the DL data portion 304 may be separated in time from the beginning of the UL short burst portion 306. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). The foregoing is one example of a DL-centric wireless communication structure, and alternative structures having similar features may exist without necessarily deviating from the aspects described herein.

As indicated above, FIG. 3 is provided as an example. Other examples are possible and may differ from what was described with regard to FIG. 3.

FIG. 4 is a diagram 400 showing an example of an UL-centric subframe or wireless communication structure. The UL-centric subframe may include a control portion 402. The control portion 402 may exist in the initial or beginning portion of the UL-centric subframe. The control portion 402 in FIG. 4 may be similar to the control portion 302 described above with reference to FIG. 3. In some configurations, the control portion 402 may be a physical DL control channel (PDCCH).

The UL-centric subframe may also include an UL long burst portion 404. The UL long burst portion 404 may sometimes be referred to as the payload of the UL-centric subframe. The UL portion may refer to the communication resources utilized to communicate UL data from the subordinate entity (e.g., UE) to the scheduling entity (e.g., UE or BS).

As illustrated in FIG. 4, the end of the control portion 402 may be separated in time from the beginning of the UL long burst portion 404. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity).

The UL-centric subframe may also include an UL short burst portion 406. The UL short burst portion 406 in FIG. 4 may be similar to the UL short burst portion 306 described above with reference to FIG. 3, and may include any of the information described above in connection with FIG. 3. The foregoing is one example of an UL-centric wireless communication structure and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

In one example, a wireless communication structure, such as a frame, may include both UL-centric subframes and DL-centric subframes. In this example, the ratio of UL-centric subframes to DL-centric subframes in a frame may be dynamically adjusted based at least in part on the amount of UL data and the amount of DL data that are transmitted. For example, if there is more UL data, then the ratio of UL-centric subframes to DL-centric subframes may be increased. Conversely, if there is more DL data, then the ratio of UL-centric subframes to DL-centric subframes may be decreased.

As indicated above, FIG. 4 is provided as an example. Other examples are possible and may differ from what was described with regard to FIG. 4.

Figure 5:
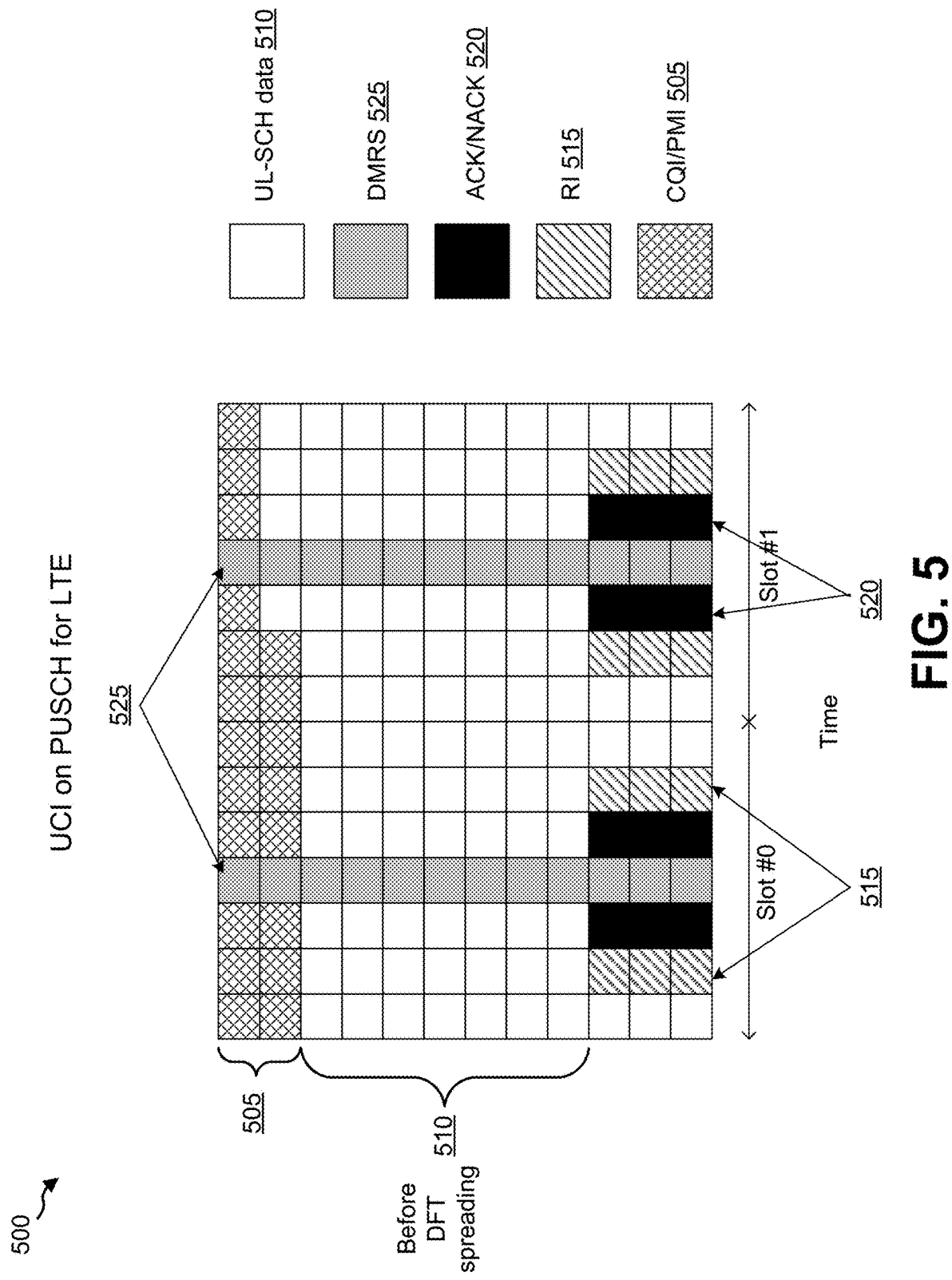
FIGS. 5, 6, 7A, and 7B are diagrams illustrating examples of acknowledgement or negative acknowledgement (ACK/NACK) signaling.

FIG. 5 is a diagram illustrating an example 500 of acknowledgement or negative acknowledgement (ACK/NACK) signaling.

In some radio access technologies, such as LTE, when a UE is scheduled to transmit both control transmissions (e.g., PUCCH transmissions) and data transmissions (e.g., PUSCH transmissions), in the same wireless communication structure (e.g., a subframe), the UE may multiplex the control transmissions and the data transmissions prior to performing a discrete Fourier transform (DFT) operation. This may be referred to as piggybacking, and may increase throughput by multiplexing the transmissions.

As shown in FIG. 5, in some aspects, the UE may rate match some control transmissions around the data transmissions. For example, the UE may rate match a channel quality indicator (CQI)/pre-coding matrix indicator (PMI) 505 around uplink data 510 (e.g., PUSCH transmissions). Additionally, or alternatively, the UE may rate match a rank indicator (RI) 515 around the uplink data 510. In some aspects, the UE may puncture the uplink data 510 with ACK/NACK signaling 520. Additionally, or alternatively, some resource element may be used for a demodulation reference signal (DMRS) 525.

In some aspects, the UE may rate match the CQI/PMI 505 and/or the RI 515 around the uplink data 510 because a base station communicating with the UE stores information regarding whether to expect receipt of the CQI/PMI 505 and/or the RI 515 from the UE. For example, periodic transmission of CQI/PMI 505 and/or RI 515 by the UE may be configured during radio resource control (RRC) configuration between the UE and the base station. Additionally, or alternatively, aperiodic transmission of CQI/PMI 505 and/or RI 515 by the UE may be configured using an uplink grant sent from the base station to the UE. In this case, if the UE receives the uplink grant, then the CQI/PMI 505 and/or RI 515 may be transmitted according to the uplink grant. If the UE does not receive the uplink grant, then the UE may not transmit control or data communications corresponding to the uplink grant, in which case the base station will not receive the aperiodic CQI/PMI 505 and/or RI 515, and so will not have any decoding errors for the CQI/PMI 505 and/or RI 515.

In some aspects, the UE may puncture the uplink data 510 with the ACK/NACK signaling 520 to reduce decoding errors as compared to rate matching the ACK/NACK signaling 520 around the uplink data 510. Rate matching the ACK/NACK signaling 520 around the uplink data 510 may result in decoding errors because the base station does not store information regarding whether to expect receipt of the ACK/NACK signaling 520 (e.g., the base station does not know whether the UE will receive a downlink grant or not). For example, if a base station is configured to assume that the UE rate matches the ACK/NACK signaling 520 around the uplink data 510, and the UE does not transmit the ACK/NACK signaling 520 (e.g., due to a missed downlink grant), then the base station may fail to decode the uplink data 510 due to a log likelihood ratio (LLR) location mismatch. Thus, puncturing the uplink data 510 with the ACK/NACK signaling 520 may reduce decoding errors.

However, in some radio access technologies, such as 5G, puncturing the uplink data 510 with the ACK/NACK signaling 520 may cause a larger performance degradation as compared to other radio access technologies, such as LTE. For example, the ACK/NACK signaling 520 may have a larger payload size due to the use of carrier aggregation. Additionally, or alternatively, the ACK/NACK signaling 520 may have a larger payload size due to the use of multiple downlink code block groups with multiple corresponding ACKs/NACKs (e.g., one ACK/NACK for each code block group). With the larger ACK/NACK signaling payload size, rate matching the ACK/NACK signaling 520 around the uplink data 510 may lead to better performance (e.g., throughput, delay, and/or the like) than puncturing the uplink data 510 with the ACK/NACK signaling 520. However, as indicated above, rate matching the ACK/NACK signaling 520 around the uplink data 510 may lead to decoding errors when the base station does not have information regarding whether to expect receipt of the ACK/NACK signaling 520. Techniques described herein assist with indicating, to the base station, whether ACK/NACK signaling 520 is present in an uplink transmission, thereby enhancing performance by permitting use of rate matching while reducing decoding errors.

As indicated above, FIG. 5 is provided as an example. Other examples are possible and may differ from what was described with regard to FIG. 5.

Figure 6:
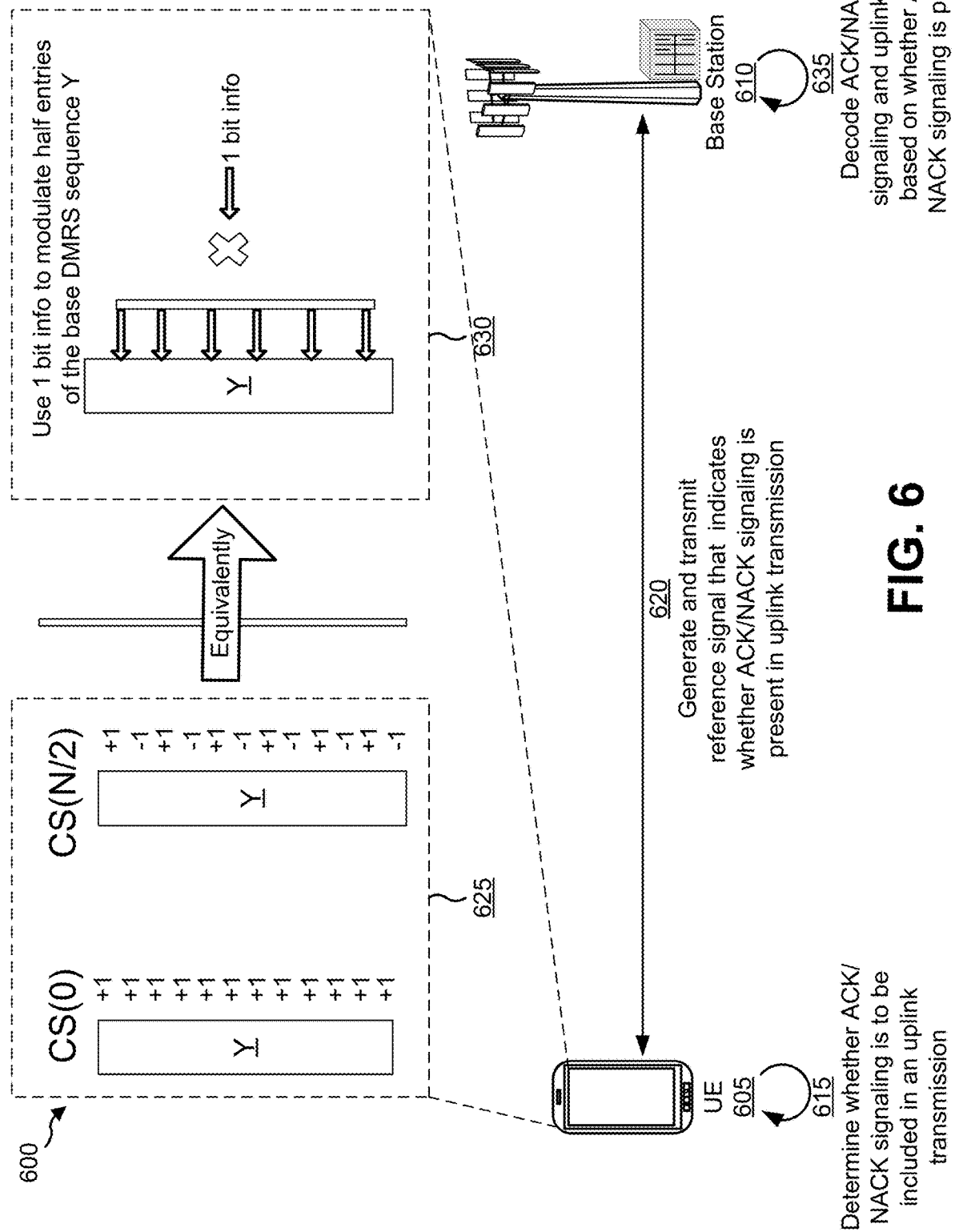

FIG. 6 is a diagram illustrating another example 600 of ACK/NACK signaling using a reference signal. As shown in FIG. 6, a UE 605 may communicate with a base station 610. In some aspects, the UE 605 may correspond to one or more UEs described elsewhere herein, such as UE 120 of FIG. 1 and/or the like. Additionally, or alternatively, the base station 610 may correspond to one or more base stations described elsewhere herein, such as base station 110 of FIG. 1 and/or the like.

At 615, the UE 605 may determine whether ACK/NACK signaling is to be included in an uplink transmission in a portion of uplink resources allocated for a data channel. In some aspects, the portion of uplink resources allocated for the data channel is a PUSCH. In some aspects, the UE 605 may include ACK/NACK signaling in the uplink transmission when a downlink grant is received by the UE 605. For example, the UE 605 may include an ACK in the uplink transmission when downlink data, corresponding to the downlink grant, is received and successfully decoded. Additionally, or alternatively, the UE 605 may include a NACK in the uplink transmission when downlink data, corresponding to the downlink grant, is not received or is not successfully decoded. In some aspects, the UE 605 may not include ACK/NACK signaling in the uplink transmission when a downlink grant is missed by the UE 605 (e.g., because the UE 605 is unaware of downlink data to be acknowledged or negatively acknowledged).

At 620, the UE 605 may generate a reference signal that indicates whether the ACK/NACK signaling is present in the uplink transmission, and may transmit the reference signal. In some aspects, the UE 605 may modulate the reference signal to indicate whether the ACK/NACK signaling is present in the uplink transmission. Additionally, or alternatively, one or more cyclic shifts or one or more phase rampings of the reference signal may indicate whether the ACK/NACK signaling is present in the uplink transmission. For example, the UE 605 may modify one or more cyclic shifts and/or one or more phase rampings of the reference signal to indicate whether the ACK/NACK signaling is present in the uplink transmission.

In some aspects, the reference signal includes a single symbol. For example, the reference signal may be a DMRS with one symbol. In this case, the single symbol may indicate whether the ACK/NACK signaling is present in the uplink transmission. For example, the single symbol may be a sequence (e.g., a DMRS sequence) having a cyclic shift or a phase ramping that indicates whether the ACK/NACK signaling is present in the uplink transmission. In some aspects, a first cyclic shift or a first phase ramping of the reference signal (e.g., the single symbol) may indicate that ACK/NACK signaling is present in the uplink transmission, and a second cyclic shift or a second phase ramping of the reference signal may indicate that ACK/NACK signaling is not present in the uplink transmission.

Referring to the example at 625, a first cyclic shift is shown as CS(0), indicating no cyclic shift for the sequence, and a second cyclic shift is shown as CS(N/2), indicating a cyclic shift of N/2, where N is a length of the sequence. In some aspects, a cyclic shift of zero may indicate that ACK/NACK signaling is present in the uplink transmission, and a second cyclic shift of N/2 may indicate that ACK/NACK signaling is not present in the uplink transmission. In some aspects, a cyclic shift of N/2 may indicate that ACK/NACK signaling is present in the uplink transmission, and a second cyclic shift of zero may indicate that ACK/NACK signaling is not present in the uplink transmission.

In some aspects, the reference signal includes at least two symbols. For example, the reference signal may be a DMRS with two symbols. In this case, the two symbols may indicate whether the ACK/NACK signaling is present in the uplink transmission. For example, the UE 605 may generate the two symbols with a same cyclic shift and/or phase ramping or different cyclic shifts and/or phase rampings to indicate whether the ACK/NACK signaling is present in the uplink transmission. In some aspects, a first pair of cyclic shifts or a first pair of phase rampings of the two symbols may indicate that ACK/NACK signaling is present in the uplink transmission, and a second pair of cyclic shifts or a second pair of phase rampings of the two symbols may indicate that ACK/NACK signaling is not present in the uplink transmission.

Referring again to the example at 625, a first cyclic shift for the first symbol is shown as CS(0), indicating no cyclic shift for the sequence used for the first symbol, and a second cyclic shift is shown as CS(N/2), indicating a cyclic shift of N/2 for the sequence used for the second symbol. In this case, different cyclic shifts are used for the two symbols of the reference signal (e.g., zero and N/2). In some aspects, different cyclic shifts for the two symbols may indicate that ACK/NACK signaling is present in the uplink transmission, and the same cyclic shift for the two symbols (e.g., zero and zero, N/2 and N/2, and/or the like) may indicate that ACK/NACK signaling is not present in the uplink transmission. In some aspects, the same cyclic shift for the two symbols may indicate that ACK/NACK signaling is present in the uplink transmission, and different cyclic shifts for the two symbols may indicate that ACK/NACK signaling is not present in the uplink transmission.

Referring to the example at 630, in some aspects, the UE 605 may use 1 bit of information (e.g., a binary indication of whether ACK/NACK signaling is present in the uplink transmission) to modulate half of the entries of the base DMRS sequence (e.g., shown as "Y"). In this way, the UE 605 may modulate the reference signal in the time domain (e.g., using a cyclic shift) or in the frequency domain (e.g., using phase ramping, such as phase ramping with a slope of pi). In some aspects, the UE 605 may modulate the reference signal to deliver one bit of information, as described above. Additionally, or alternatively, the UE 605 may modulate the reference signal to deliver more than one bit of information, such as information indicating a quantity of ACK/NACK signaling bits transmitted by the UE 605. For example, a first cyclic shift or a first phase ramping of the reference signal may indicate that ACK/NACK signaling is not present in the uplink transmission, a second cyclic shift or a second phase ramping of the reference signal may indicate that one bit of ACK/NACK signaling is present in the uplink transmission, a third cyclic shift or a third phase ramping of the reference signal may indicate that two bits of ACK/NACK signaling are present in the uplink transmission, a fourth cyclic shift or a fourth phase ramping of the reference signal may indicate that three bits of ACK/NACK signaling are present in the uplink transmission, and/or the like.

In some aspects, the indication in the reference signal of whether ACK/NACK signaling is present in the uplink transmission may be an indication of whether uplink data is rate matched around the ACK/NACK signaling in the uplink transmission. In some aspects, the indication in the reference signal of whether ACK/NACK signaling is present in the uplink transmission may be an indication of whether uplink data is punctured by the ACK/NACK signaling in the uplink transmission. For example, ACK/NACK signaling between the UE 605 and the base station 610 may be configured for rate matching (e.g., by default, based at least in part on an RRC configuration, and/or the like). In this case, the reference signal may indicate whether uplink data is rate matched around the ACK/NACK signaling in the uplink transmission. As another example, ACK/NACK signaling between the UE 605 and the base station 610 may be configured for puncturing (e.g., by default, based at least in part on an RRC configuration, and/or the like). In this case, the reference signal may indicate whether uplink data is punctured by the ACK/NACK signaling in the uplink transmission.

At 635, the base station 610 may receive the reference signal, may determine whether the ACK/NACK signaling was received in the uplink transmission based at least in part on the reference signal, and may decode the ACK/NACK signaling and/or uplink data included in the uplink transmission based at least in part on whether the ACK/NACK signaling is present. In some aspects, the base station 610 may decode the ACK/NACK signaling when the ACK/NACK signaling is received. Additionally, or alternatively, the base station 610 may decode uplink data in the uplink transmission based at least in part on whether the ACK/NACK signaling was received.

In some aspects, when the ACK/NACK signaling is received by the base station 610, the base station 610 may decode uplink data from a set of resource elements (REs) other than resource elements in which the ACK/NACK signaling is received. For example, the uplink data may be included in a first set of REs, in the uplink transmission, that are rate matched around a second set of REs, in the uplink transmission, that include the ACK/NACK signaling. Additionally, or alternatively, the second set of REs may puncture some uplink data in the uplink transmission, and uplink data may remain in the first set of REs. In either case, when the reference signal indicates that ACK/NACK signaling is present in the uplink transmission, the base station 610 may decode the uplink data from the first set of REs (e.g., and may not use the second set of REs for decoding uplink data). In some aspects, the base station 610 may apply a rule to collect log likelihood ratio (LLR) results from the first set of REs that include uplink data (and not the second set of REs that include ACK/NACK signaling or other REs that include, for example, CQI, PMI, RI, and/or the like). In some aspects, the rule may be different depending on whether puncturing or rate matching is used for ACK/NACK signaling in the uplink transmission.

In some aspects, when the ACK/NACK signaling is not received by the base station 610, the base station 610 may decode uplink data from a set of resource elements (REs) including resource elements in which the ACK/NACK signaling would otherwise be received. For example, when ACK/NACK signaling is not present in an uplink transmission, the UE 605 may include uplink data in the first set of REs and the second set of REs (e.g., as described above), where the second set of REs would otherwise be used for ACK/NACK signaling if ACK/NACK signaling were present in the uplink transmission. In this case, when the reference signal indicates that ACK/NACK signaling is not present in the uplink transmission, the base station 610 may decode the uplink data from the first set of REs (e.g., uplink data REs) and the second set of REs (e.g., ACK/NACK signaling REs). In some aspects, the base station 610 may apply a rule to collect log likelihood ratio (LLR) results from the first set of REs and the second set of REs that include uplink data (and not other REs that include, for example, CQI, PMI, RI, and/or the like).

In some aspects, the UE 605 and/or the base station 610 may enable or disable the indication of ACK/NACK signaling using a reference signal. For example, if a UE 605 is associated with good channel conditions (e.g., based on an indication of channel conditions, such as RSRP, RSRQ, and/or the like, satisfying a threshold), then such reference signal indications may be disabled by the UE 605 (e.g., autonomously or based at least in part on an instruction from the base station 610). In this way, network resources may be conserved.

Although techniques are described above in connection with using a reference signal to indicate whether ACK/NACK signaling is present in an uplink transmission, other techniques may be used. For example, in some aspects, dedicated resource elements may be used to indicate whether ACK/NACK signaling is present in an uplink transmission. In some aspects, the dedicated resource elements may be indicated in configuration information communicating between the base station 610 and the UE 605 (e.g., in an RRC message). In some aspects, the dedicated resource elements may be encoded for repetition (e.g., to repeat 1 bit of information in multiple resource elements). Additionally, or alternatively, the dedicated resource elements may be modulated using a dedicated modulation order (e.g., QPSK), which may be signaled (e.g., in an RRC message).

Additionally, or alternatively, one or more dedicated resource elements may indicate a payload size of the ACK/NACK signaling. Additionally, or alternatively, one or more dedicated resource elements may indicate the communications (e.g., downlink grants) to which the ACK/NACK signaling corresponds (e.g., a bitmap that maps ACK/NACK signals to downlink grants). For example, if the base station 610 schedules four downlink grants for the UE 605 (e.g., in 4 slots, in 4 carriers, in a combination of 2 slots and 2 carriers, etc.), then the UE 605 may indicate which downlink grants were received and/or missed using dedicated resource elements. For example, signaling a bitmap of 1101 may indicate that the UE 605 sends ACK/NACK signaling for the first, second, and fourth downlink grants, and that the UE 605 missed the third downlink grant and did not send ACK/NACK signaling for the third downlink grant. In this way, the base station 610 may send downlink retransmissions according to which downlink grants were missed by the UE 605.

Additionally, or alternatively, the base station 610 and/or the UE 605 may use an RRC message to semi-statically configure the payload size of the ACK/NACK signaling and/or the bitmap that maps ACK/NACK signals to downlink grants. In this way, resource elements may be conserved and/or used for other purposes. For example, if the UE 605 is configured with two component carriers in transmission mode 4 (e.g., rank 2), then the UE 605 may have four bits in the ACK/NACK signaling fields. The first two bits may correspond to the first component carrier and the second two bits corresponding to the second component carrier. In this case, even if the UE 605 is only scheduled on one component carrier, then the UE 605 will include NACK signaling in the corresponding field to resolve the payload size ambiguity at the base station 610. In other words, the payload size may be fixed based on the configuration indicated by the base station 610. In this case, the UE 605 may either send nothing if the UE 605 missed both downlink grants on both component carriers, or may send four bits if the UE 605 received at least one downlink grant. In this scenario, there may be ambiguity at the base station 610 regarding whether to expect receipt of ACK/NACK signaling if the UE 605 misses both downlink grant on the two component carriers. In this case, the ACK/NACK signaling will not be transmitted from the UE 605, but the base station 610 will still expect 4 bits of ACK/NACK signaling. However, this situation can be resolved to reduce errors by using different reference signal (e.g., DMRS) sequences to indicate to the base station 610 whether ACK/NACK signaling has been transmitted, as described in more detail elsewhere herein.

Additionally, or alternatively, the base station 610 may bundle downlink grants and uplink grants. In this way, if the UE 605 receives the downlink grant, the UE 605 will also receive the uplink grant, and will transmit an uplink transmission based at least in part on receiving the uplink grant. In this case, the base station 610 will expect receipt of ACK/NACK signaling because if the base station 610 receives an uplink transmission corresponding to the uplink grant, then the base station 610 determines that the UE 605 also received the downlink grant. If the UE 605 does not receive the downlink grant, then the UE 605 will also not receive the uplink grant, and will not transmit an uplink transmission, so the base station 610 will not fail to decode the uplink transmission.

By indicating to the base station 610 whether ACK/NACK signaling is present in an uplink transmission, the UE 605 may improve performance by permitting use of rate matching while reducing decoding errors, as described elsewhere herein.

As indicated above, FIG. 6 is provided as an example. Other examples are possible and may differ from what was described with regard to FIG. 6.

Figure 7A:
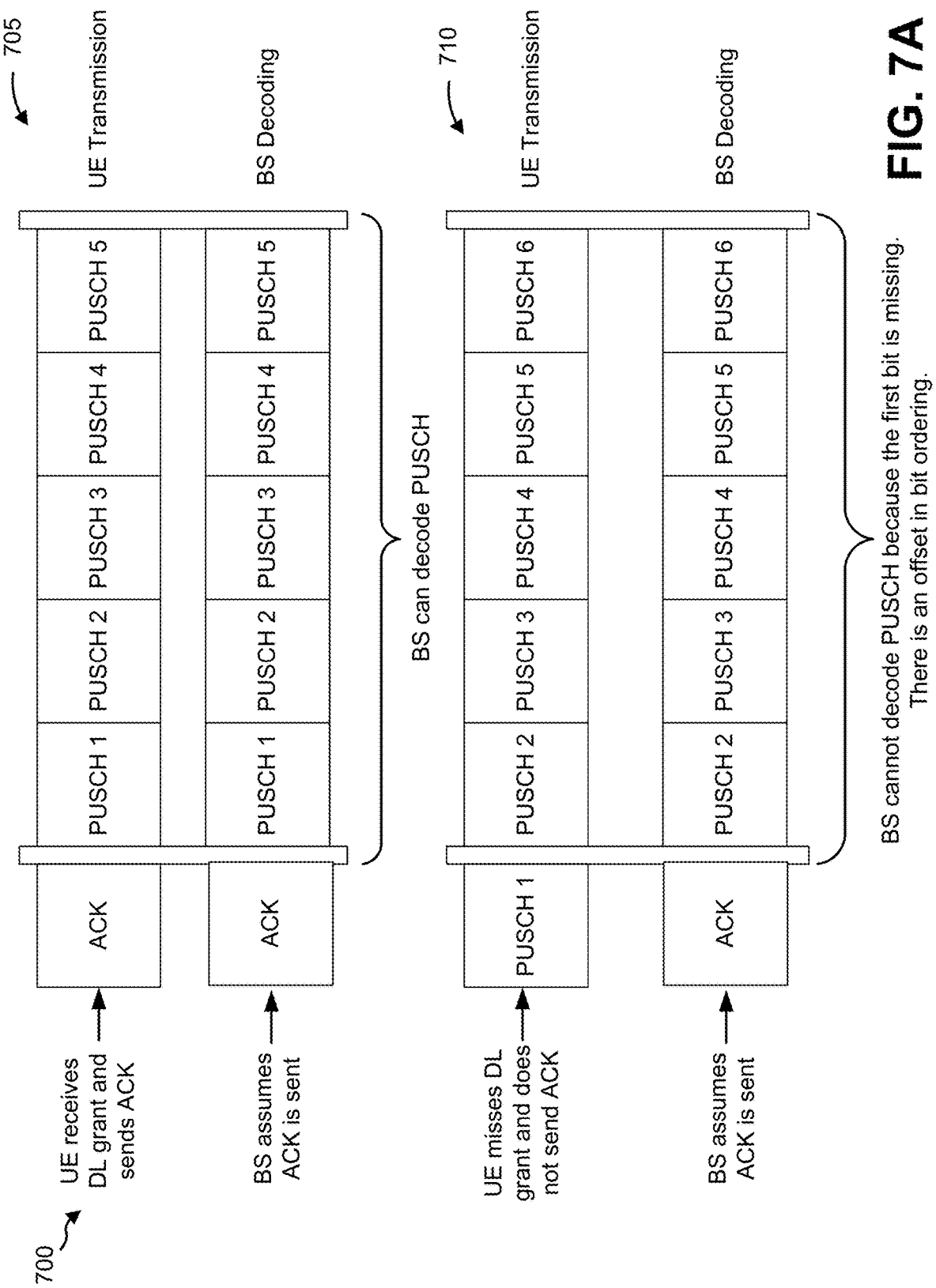
Figure 7B:
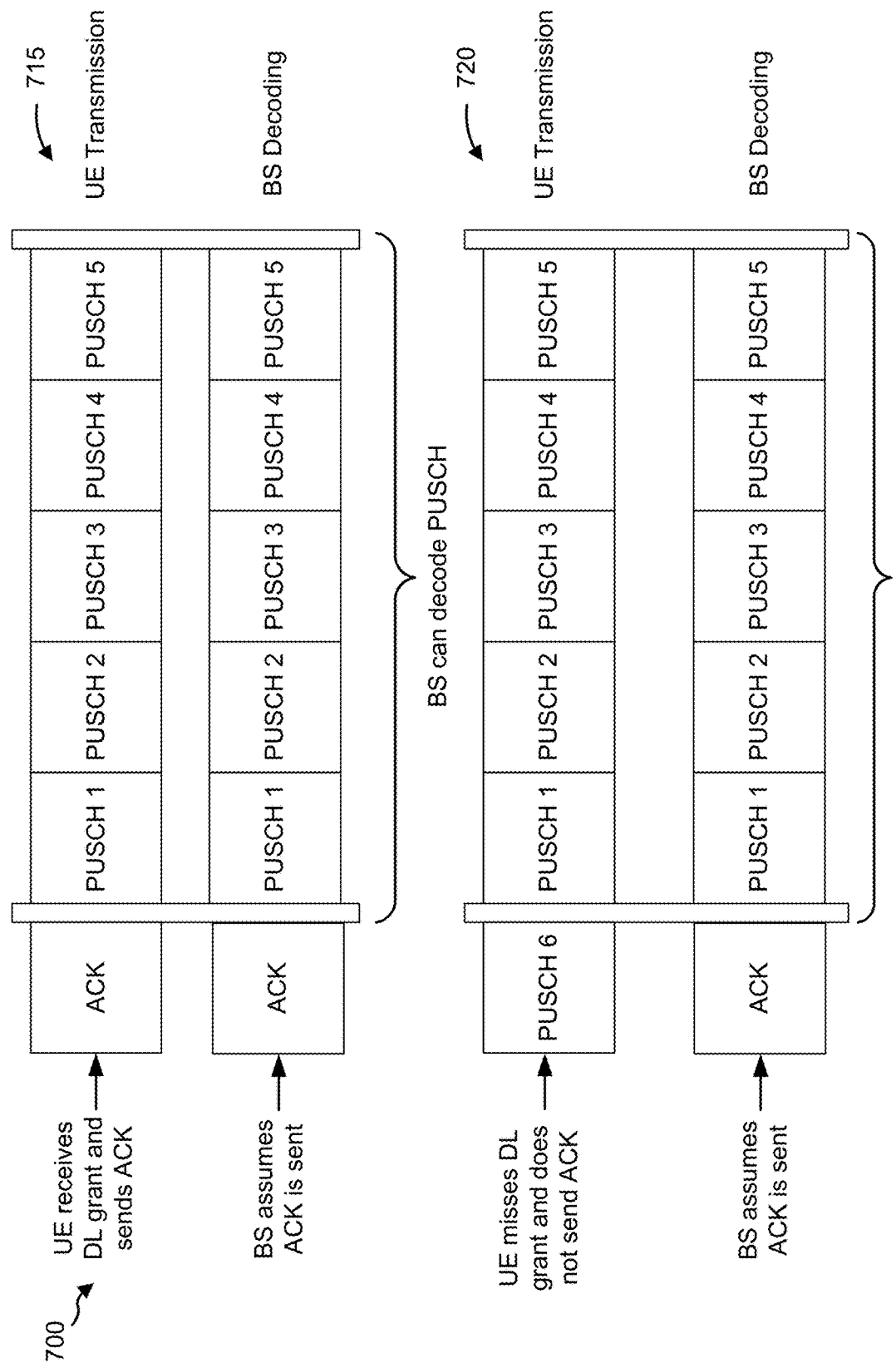

FIGS. 7A and 7B are diagrams illustrating another example 700 of ACK/NACK signaling. FIGS. 7A and 7B show an example of a special rate matching pattern for ACK/NACK signaling that reduces decoding errors at the base station. In FIGS. 7A and 7B, each block represents a resource element (RE) along a symbol period.

As shown in FIG. 7A, when the UE does not use the special rate matching pattern, the UE may begin filling ACK/NACK signaling REs (e.g., one or more REs that the base station assumes includes ACK/NACK signaling) with uplink data (e.g., shown as PUSCH 1, PUSCH 2, and so on) instead of ACK/NACK signaling. At 705, without using the special rate matching pattern, if the UE receives a downlink grant and sends an ACK, and the base station (BS) assumes that the ACK is sent, then the base station will be able to decode the uplink data (e.g., on the PUSCH) because the first bit of uplink data (PUSCH 1) is received in the RE in which the base station expects to receive the first bit of uplink data. However, at 710, without using the special rate matching pattern, if the UE misses the downlink grant and does not send an ACK, and the UE instead sends the first bit of uplink data (PUSCH 1) in the RE in which the base station is expecting ACK/NACK signaling, then the base station will not be able to decode the uplink data because the base station assumes that the RE that includes the first bit of uplink data (shown as PUSCH 1) includes an ACK, and thus will not include this RE when decoding the uplink data. Thus, the base station will start decoding with PUSCH 2 rather than PUSCH 1, and the decoding will fail. This rate matching pattern results in an offset in bit ordering, resulting in a decoding failure of uplink data.

As shown in FIG. 7B, when the UE uses the special rate matching pattern, the UE may first rate match around ACK/NACK signaling REs (e.g., by assuming that ACK/NACK signaling will be sent) until all uplink data REs (e.g., PUSCH REs) are filled. Then, if the UE receives a downlink grant, the UE may map ACK/NACK signaling to ACK/NACK signaling REs. If the UE misses the downlink grant, then the UE may map modulated uplink data symbols (e.g., PUSCH symbols) onto the ACK/NACK signaling REs (e.g., REs that would otherwise be used for ACK/NACK signaling if the UE received the downlink grant).

At 715, if the UE receives a downlink grant and sends an ACK, and the base station assumes that the ACK is sent, then the base station will be able to decode the uplink data (e.g., on the PUSCH) because the first bit of uplink data (PUSCH 1) is received in the RE in which the base station expects to receive the first bit of uplink data. Furthermore, at 720, if the UE misses the downlink grant and does not send an ACK, and the base station assumes that the ACK is sent, then the base station will still be able to decode the uplink data because the base station will start decoding with PUSCH 1 after skipping the ACK/NACK signaling RE, which includes PUSCH 6. This special rate matching pattern results in a correct bit ordering, resulting in a successful decoding of uplink data.

As indicated above, FIGS. 7A and 7B are provided as examples. Other examples are possible and may differ from what was described with regard to FIGS. 7A and 7B.

Figure 8:
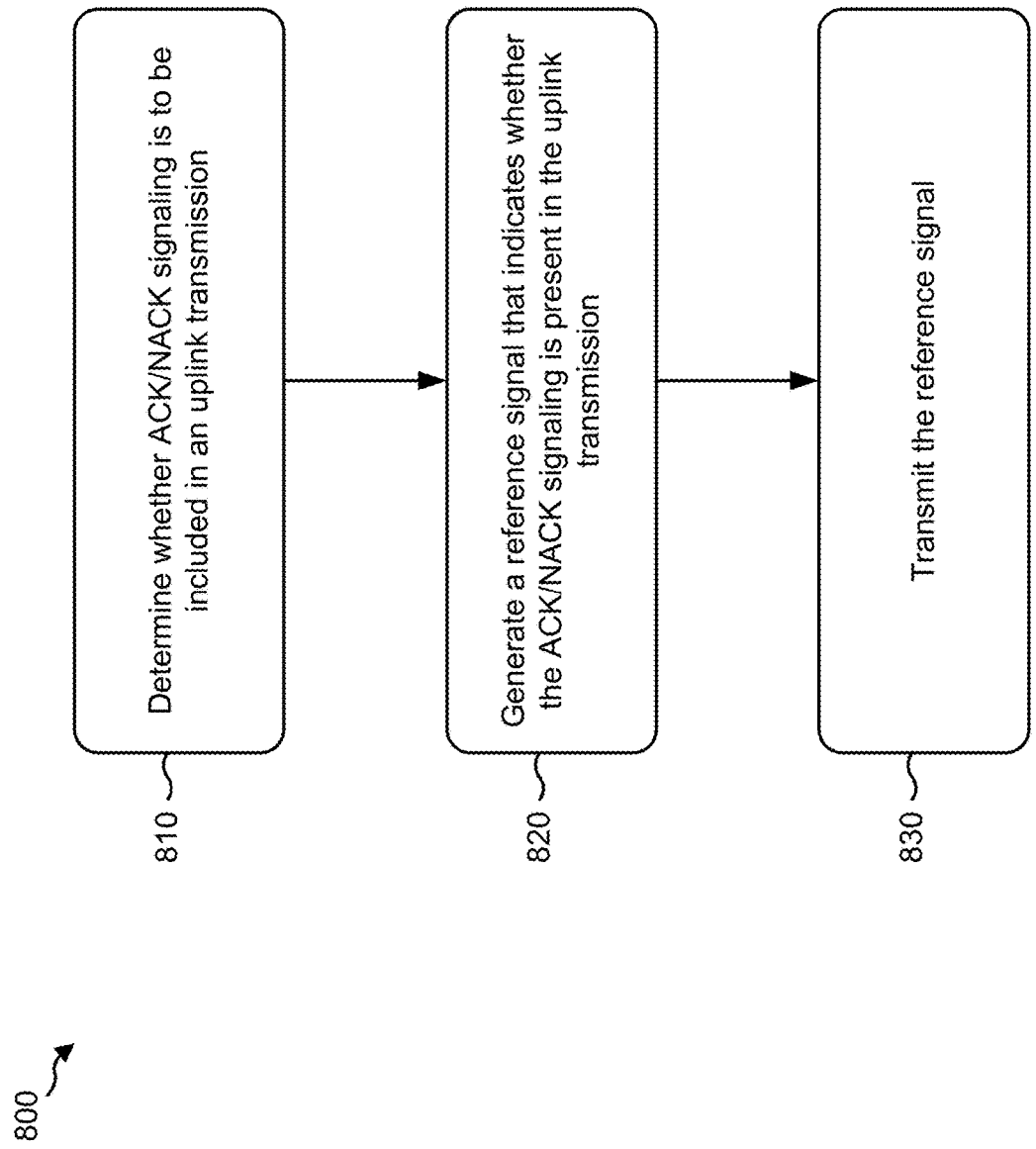
FIG. 8 is a flow chart of a method of wireless communication.

FIG. 8 is a flow chart of a method 800 of wireless communication. The method may be performed by a UE (e.g., the UE 120 of FIG. 1, the UE 605 of FIG. 6, the apparatus 1002/1002' of FIG. 10/11, and/or the like).

At 810, the UE may determine whether ACK/NACK signaling is to be included in an uplink transmission. For example, the UE may determine whether ACK/NACK signaling is to be included in an uplink transmission in a portion of uplink resources allocated for a data channel, as described in more detail above in connection with FIG. 6.

At 820, the UE may generate a reference signal that indicates whether the ACK/NACK signaling is present in the uplink transmission. For example, the UE may generate a reference signal that indicates whether the ACK/NACK signaling is present in the uplink transmission, as described in more detail above in connection with FIG. 6.

At 830, the UE may transmit the reference signal. For example, the UE may transmit the reference signal that indicates whether the ACK/NACK signaling is present in the uplink transmission, as described in more detail above in connection with FIG. 6.

Method 800 may include additional aspects, such as any single aspect or any combination of aspects described below and/or in connection with one or more other methods described elsewhere herein.

In some aspects, the reference signal is modulated to indicate whether the ACK/NACK signaling is present in the uplink transmission. In some aspects, one or more cyclic shifts or one or more phase rampings of the reference signal indicate whether the ACK/NACK signaling is present in the uplink transmission.

In some aspects, a single symbol of the reference signal indicates whether the ACK/NACK signaling is present in the uplink transmission. In some aspects, the single symbol includes a sequence having a cyclic shift or a phase ramping that indicates whether the ACK/NACK signaling is present in the uplink transmission.

In some aspects, at least two symbols of the reference signal indicate whether the ACK/NACK signaling is present in the uplink transmission. In some aspects, the at least two symbols are generated with a same cyclic shift or phase ramping or different cyclic shifts or phase rampings to indicate whether the ACK/NACK signaling is present in the uplink transmission.

In some aspects, the reference signal is a demodulation reference signal. In some aspects, the reference signal indicates whether uplink data is rate matched around the ACK/NACK signaling in the uplink transmission. In some aspects, the reference signal indicates whether uplink data is punctured by the ACK/NACK signaling in the uplink transmission. In some aspects, a payload size of the ACK/NACK signaling is indicated using one or more dedicated resource elements. In some aspects, the portion of uplink resources allocated for the data channel is a physical uplink shared channel.

Although FIG. 8 shows example blocks of a method of wireless communication, in some aspects, the method may include additional blocks, fewer blocks, different blocks, or differently arranged blocks than those shown in FIG. 8. Additionally, or alternatively, two or more blocks shown in FIG. 8 may be performed in parallel.

Figure 9:
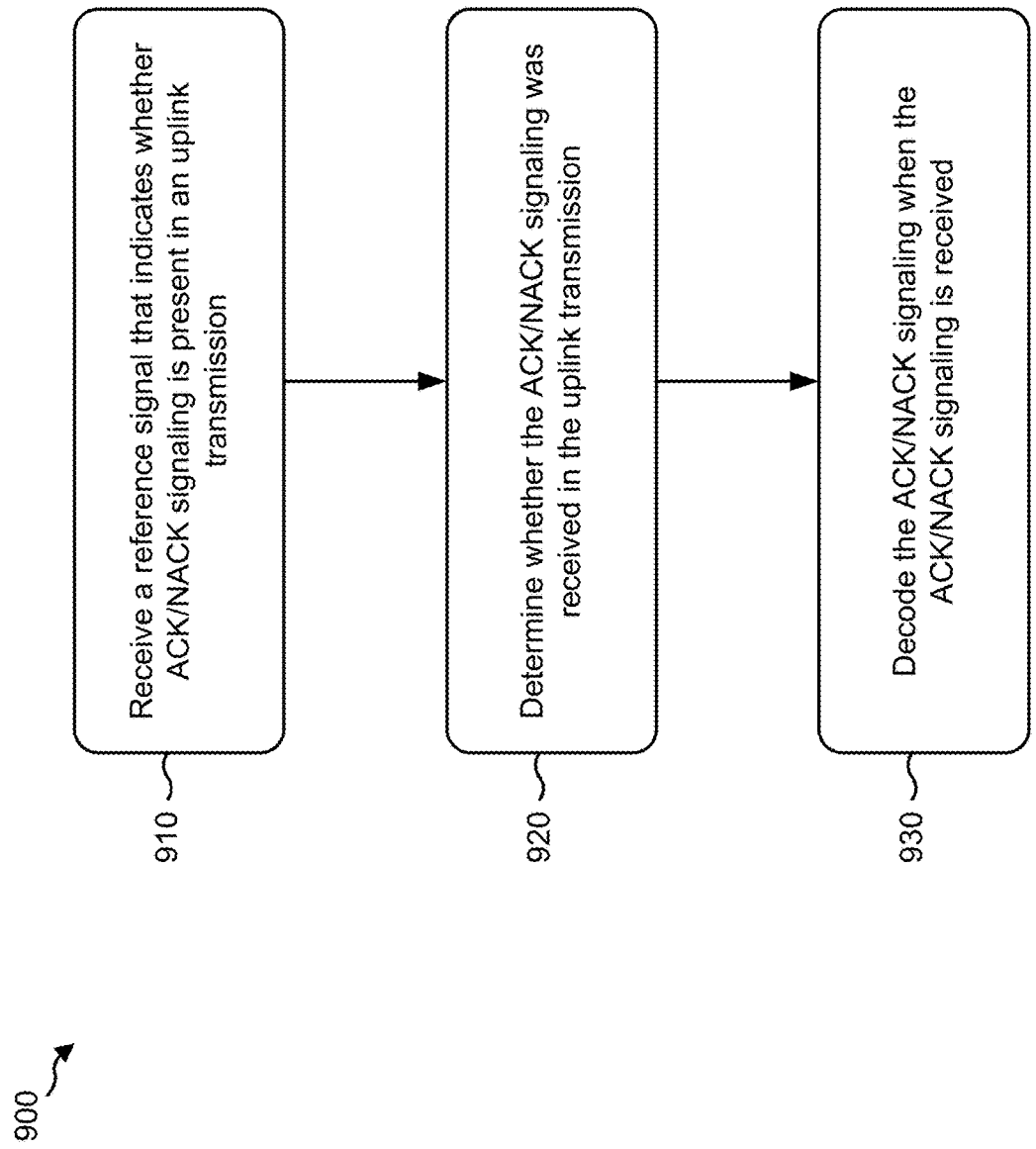
FIG. 9 is a flow chart of another method of wireless communication.

FIG. 9 is a flow chart of a method 900 of wireless communication. The method may be performed by a base station (e.g., the base station 110 of FIG. 1, the base station 610 of FIG. 6, the apparatus 1202/1202' of FIG. 12/13, and/or the like).

At 910, the base station may receive a reference signal that indicates whether ACK/NACK signaling is present in an uplink transmission. For example, the base station may receive a reference signal that indicates whether ACK/NACK signaling is present in an uplink transmission in a portion of uplink resources allocated for a data channel, as described in more detail above in connection with FIG. 6.

At 920, the base station may determine whether the ACK/NACK signaling was received in the uplink transmission. For example, the base station may determine whether the ACK/NACK signaling was received in the uplink transmission based at least in part on the reference signal, as described in more detail above in connection with FIG. 6.

At 930, the base station may decode the ACK/NACK signaling when the ACK/NACK signaling is received. For example, the base station may decode the ACK/NACK signaling when the ACK/NACK signaling is received, as described in more detail above in connection with FIG. 6.

Method 900 may include additional aspects, such as any single aspect or any combination of aspects described below and/or in connection with one or more other methods described elsewhere herein.

In some aspects, the base station may decode uplink data in the uplink transmission based at least in part on whether the ACK/NACK signaling was received. In some aspects, when the ACK/NACK signaling is received, the uplink data is decoded from a set of resource elements other than resource elements in which the ACK/NACK signaling is received. In some aspects, a set of resource elements are decoded as the ACK/NACK signaling or uplink data based at least in part on the indication in the reference signal.

Although FIG. 9 shows example blocks of a method of wireless communication, in some aspects, the method may include additional blocks, fewer blocks, different blocks, or differently arranged blocks than those shown in FIG. 9. Additionally, or alternatively, two or more blocks shown in FIG. 9 may be performed in parallel.

Figure 10:
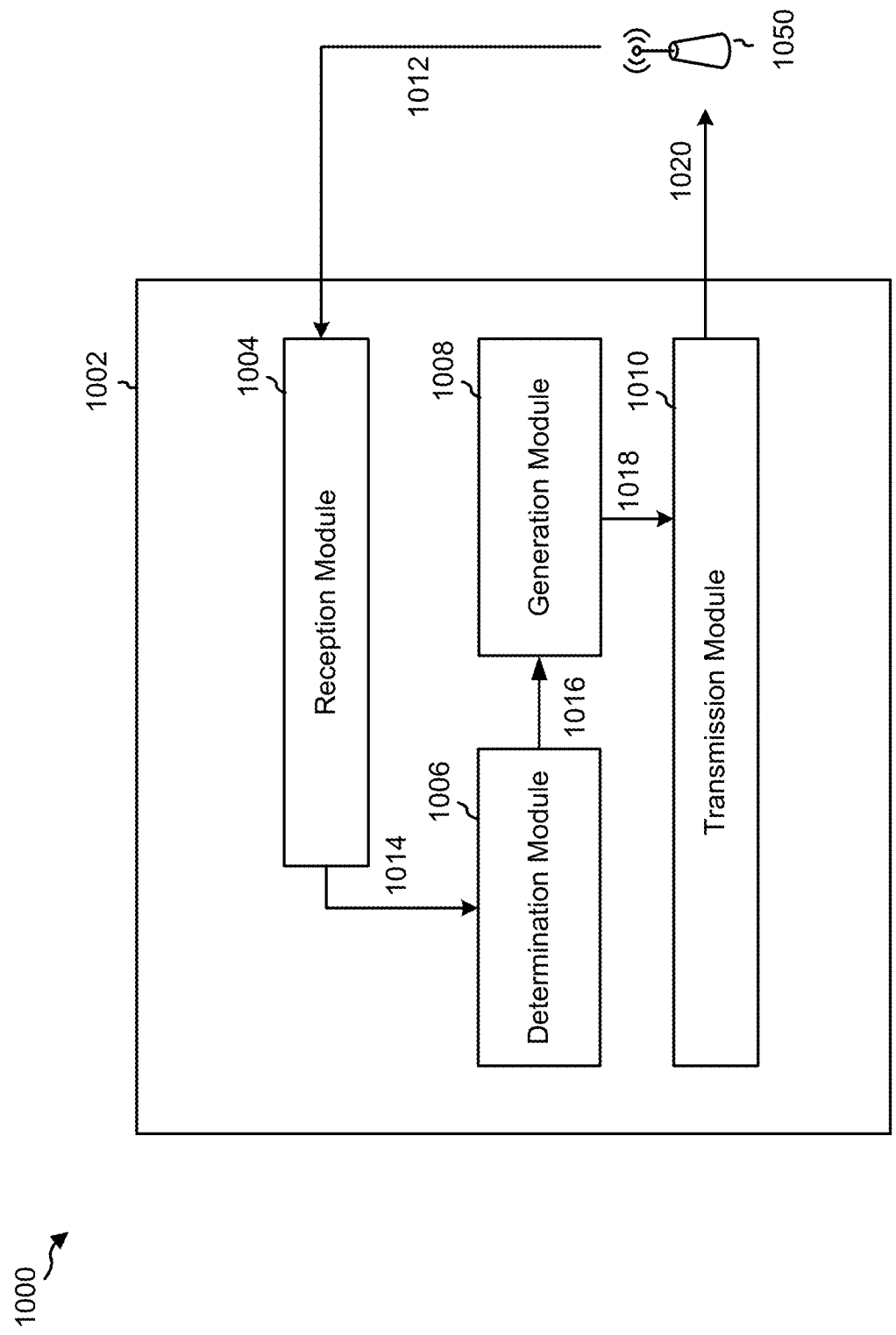
FIG. 10 is a conceptual data flow diagram illustrating the data flow between different modules/means/components in an example apparatus.

FIG. 10 is a conceptual data flow diagram 1000 illustrating the data flow between different modules/means/components in an example apparatus 1002. The apparatus 1002 may be a UE. In some aspects, the apparatus 1002 includes a reception module 1004, a determination module 1006, a generation module 1008, a transmission module 1010, and/or the like.

The reception module 1004 may receive data 1012, such as a downlink grant, from a base station 1050, and may provide data 1014 to the determination module 1006 to indicate whether a downlink grant has been received. The determination module 1006 may determine whether ACK/NACK signaling is to be included in an uplink transmission in a portion of uplink resources allocated for a data channel. For example, the determination module 1006 may determine that ACK/NACK signaling is to be included in the uplink transmission when the downlink grant is received, and may determine that ACK/NACK signaling is not to be included in the uplink transmission when the downlink grant is not received. The determination module 1006 may provide data 1016 to the generation module 1008 to indicate whether to include the ACK/NACK signaling in the uplink transmission. The generation module 1008 may generate a reference signal that indicates whether the ACK/NACK signaling is present in the uplink transmission, and may provide data 1018, such as the reference signal, to the transmission module 1010. The transmission module 1010 may transmit the reference signal and/or the uplink transmission, as data 1020, to the base station 1050.

The apparatus may include additional modules that perform each of the blocks of the algorithm in the aforementioned flow chart of FIG. 8. As such, each block in the aforementioned flow chart of FIG. 8 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof The number and arrangement of modules shown in FIG. 10 are provided as an example. In practice, there may be additional modules, fewer modules, different modules, or differently arranged modules than those shown in FIG. 10. Furthermore, two or more modules shown in FIG. 10 may be implemented within a single module, or a single module shown in FIG. 10 may be implemented as multiple, distributed modules. Additionally, or alternatively, a set of modules (e.g., one or more modules) shown in FIG. 10 may perform one or more functions described as being performed by another set of modules shown in FIG. 10.

Figure 11:
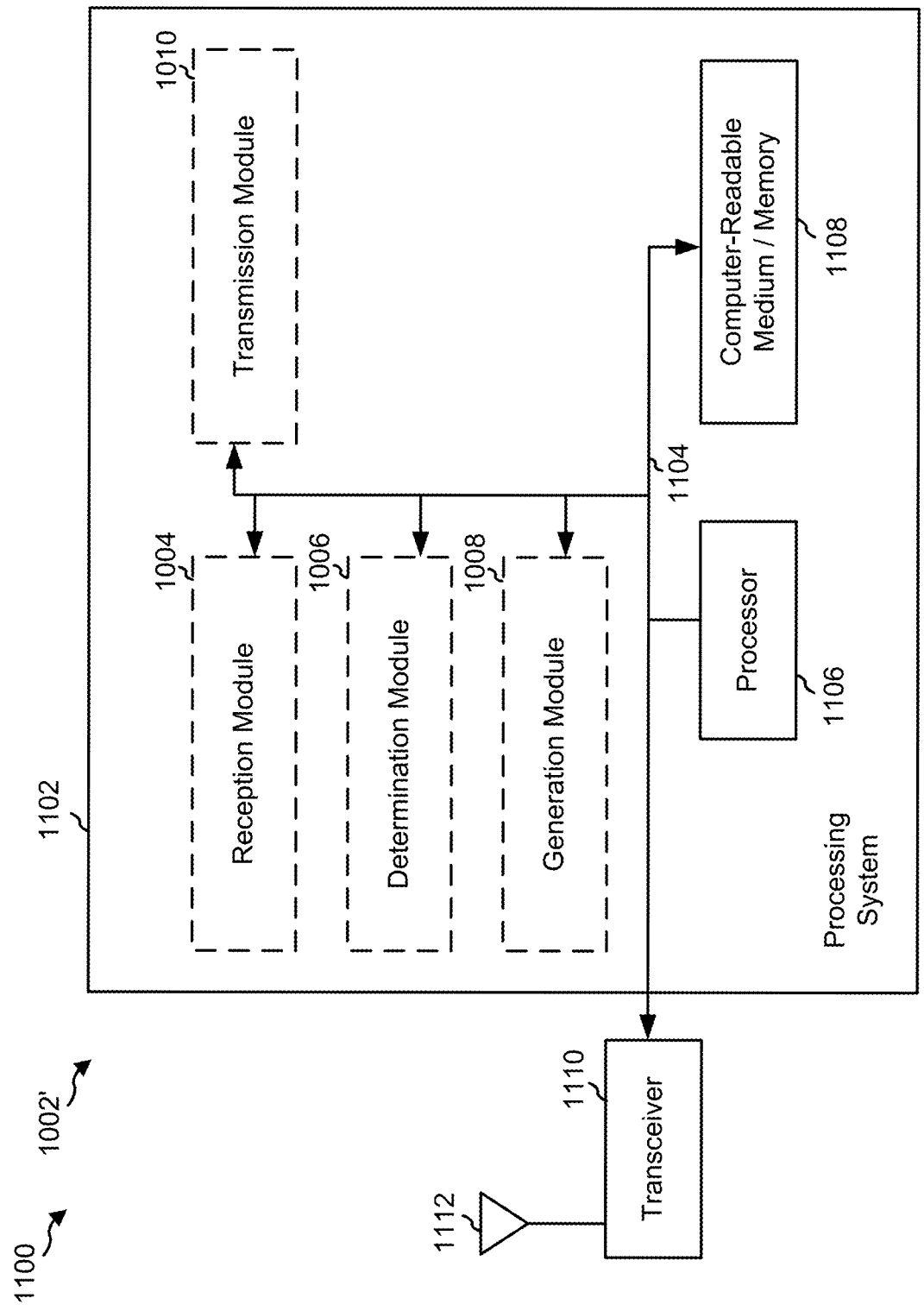
FIG. 11 is a diagram illustrating an example of a hardware implementation for an apparatus employing a processing system.

FIG. 11 is a diagram 1100 illustrating an example of a hardware implementation for an apparatus 1002' employing a processing system 1102. The apparatus 1002' may be a UE.

The processing system 1102 may be implemented with a bus architecture, represented generally by the bus 1104. The bus 1104 may include any number of interconnecting buses and bridges depending on the specific application of the processing system 1102 and the overall design constraints. The bus 1104 links together various circuits including one or more processors and/or hardware modules, represented by the processor 1106, the modules 1004, 1006, 1008, and/or 1010, and the computer-readable medium/memory 1108. The bus 1104 may also link various other circuits such as timing sources, peripherals, voltage regulators, and power management circuits, which are well known in the art, and therefore, will not be described any further.

The processing system 1102 may be coupled to a transceiver 1110. The transceiver 1110 is coupled to one or more antennas 1112. The transceiver 1110 provides a means for communicating with various other apparatus over a transmission medium. The transceiver 1110 receives a signal from the one or more antennas 1112, extracts information from the received signal, and provides the extracted information to the processing system 1102, specifically the reception module 1004. In addition, the transceiver 1110 receives information from the processing system 1102, specifically the transmission module 1010, and based at least in part on the received information, generates a signal to be applied to the one or more antennas 1112. The processing system 1102 includes a processor 1106 coupled to a computer-readable medium/memory 1108. The processor 1106 is responsible for general processing, including the execution of software stored on the computer-readable medium/memory 1108. The software, when executed by the processor 1106, causes the processing system 1102 to perform the various functions described supra for any particular apparatus. The computer-readable medium/memory 1108 may also be used for storing data that is manipulated by the processor 1106 when executing software. The processing system further includes at least one of the modules 1004, 1006, 1008, and/or 1010. The modules may be software modules running in the processor 1106, resident/stored in the computer readable medium/memory 1108, one or more hardware modules coupled to the processor 1106, or some combination thereof. The processing system 1102 may be a component of the UE 120 and may include the memory 282 and/or at least one of the TX MIMO processor 266, the RX processor 258, and/or the controller/processor 280.

In some aspects, the apparatus 1002/1002' for wireless communication includes means for determining whether ACK/NACK signaling is to be included in an uplink transmission in a portion of uplink resources allocated for a data channel, means for generating a reference signal that indicates whether the ACK/NACK signaling is present in the uplink transmission, means for transmitting the reference signal that indicates whether the ACK/NACK signaling is present in the uplink transmission, and/or the like. The aforementioned means may be one or more of the aforementioned modules of the apparatus 1002 and/or the processing system 1102 of the apparatus 1002' configured to perform the functions recited by the aforementioned means. As described supra, the processing system 1102 may include the TX MIMO processor 266, the RX processor 258, and/or the controller/processor 280. As such, in one configuration, the aforementioned means may be the TX MIMO processor 266, the RX processor 258, and/or the controller/processor 280 configured to perform the functions recited by the aforementioned means.

FIG. 11 is provided as an example. Other examples are possible and may differ from what was described in connection with FIG. 11.

Figure 12:
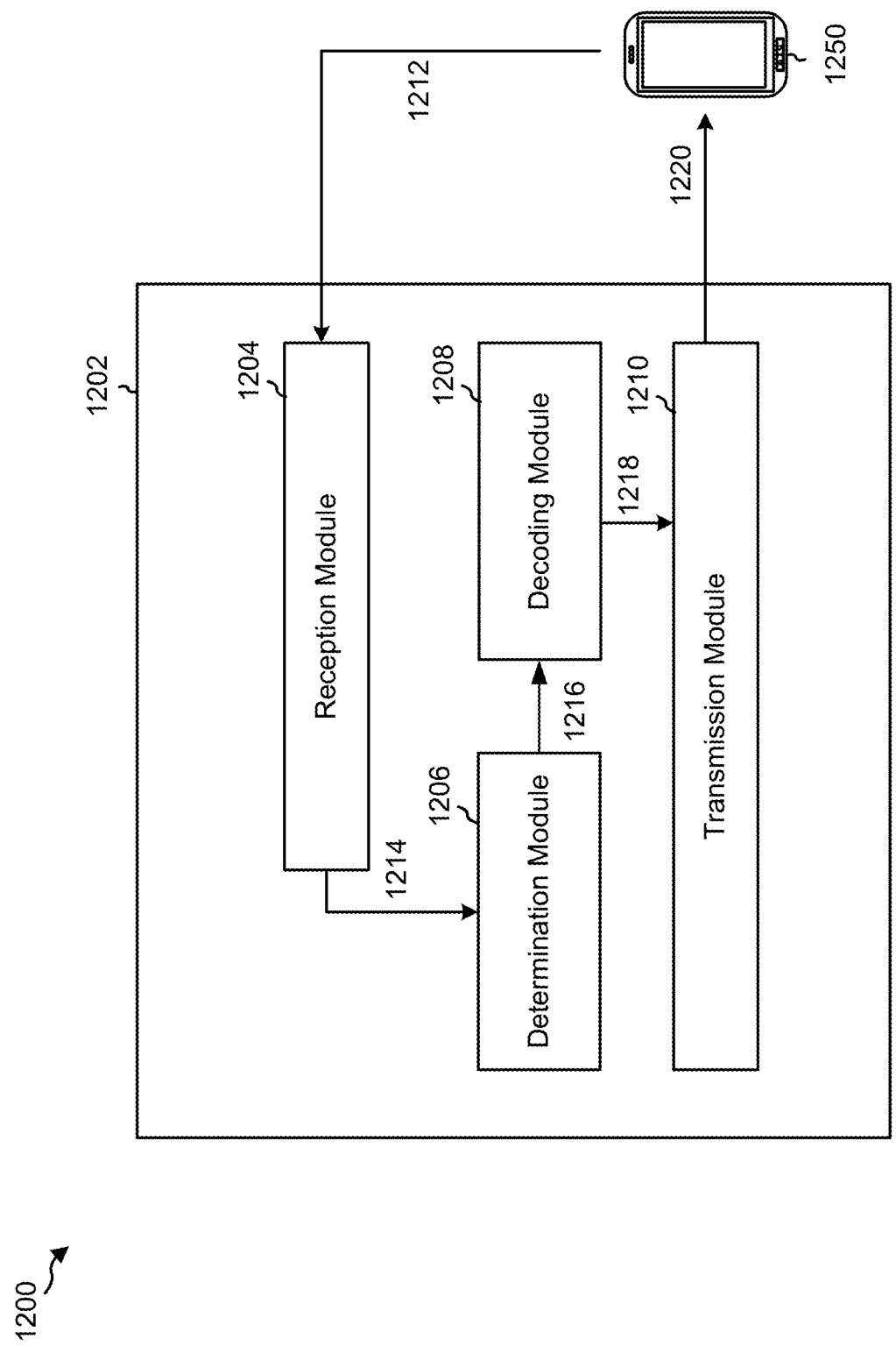
FIG. 12 is a conceptual data flow diagram illustrating the data flow between different modules/means/components in another example apparatus.

FIG. 12 is a conceptual data flow diagram 1200 illustrating the data flow between different modules/means/components in an example apparatus 1202. The apparatus 1202 may be a base station. In some aspects, the apparatus 1202 includes a reception module 1204, a determination module 1206, a decoding module 1208, a transmission module 1210, and/or the like.

The reception module 1204 may receive data 1212 from a UE 1250. The data 1212 may include, for example, a reference signal that indicates whether ACK/NACK signaling is present in an uplink transmission in a portion of uplink resources allocated for a data channel. The reception module 1204 may provide data 1214, such as the reference signal, to the determination module 1206. The determination module 1206 may determine whether the ACK/NACK signaling was received in the uplink transmission based at least in part on the reference signal, and may provide data 1216, such as an indication of whether the ACK/NACK signaling was received, to the decoding module 1208. The decoding module 1208 may decode the ACK/NACK signaling and/or uplink data in the uplink transmission based at least in part on whether the ACK/NACK signaling was received. In some aspects, the decoding module 1208 may provide data 1218, such as information associated with a result of the decoding to the transmission module 1210. The transmission module 1210 may provide data 1220 to the UE 1250, such as the information associated with the result of the decoding.

The apparatus may include additional modules that perform each of the blocks of the algorithm in the aforementioned flow chart of FIG. 9. As such, each block in the aforementioned flow chart of FIG. 9 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

The number and arrangement of modules shown in FIG. 12 are provided as an example. In practice, there may be additional modules, fewer modules, different modules, or differently arranged modules than those shown in FIG. 12. Furthermore, two or more modules shown in FIG. 12 may be implemented within a single module, or a single module shown in FIG. 12 may be implemented as multiple, distributed modules. Additionally, or alternatively, a set of modules (e.g., one or more modules) shown in FIG. 12 may perform one or more functions described as being performed by another set of modules shown in FIG. 12.

Figure 13:
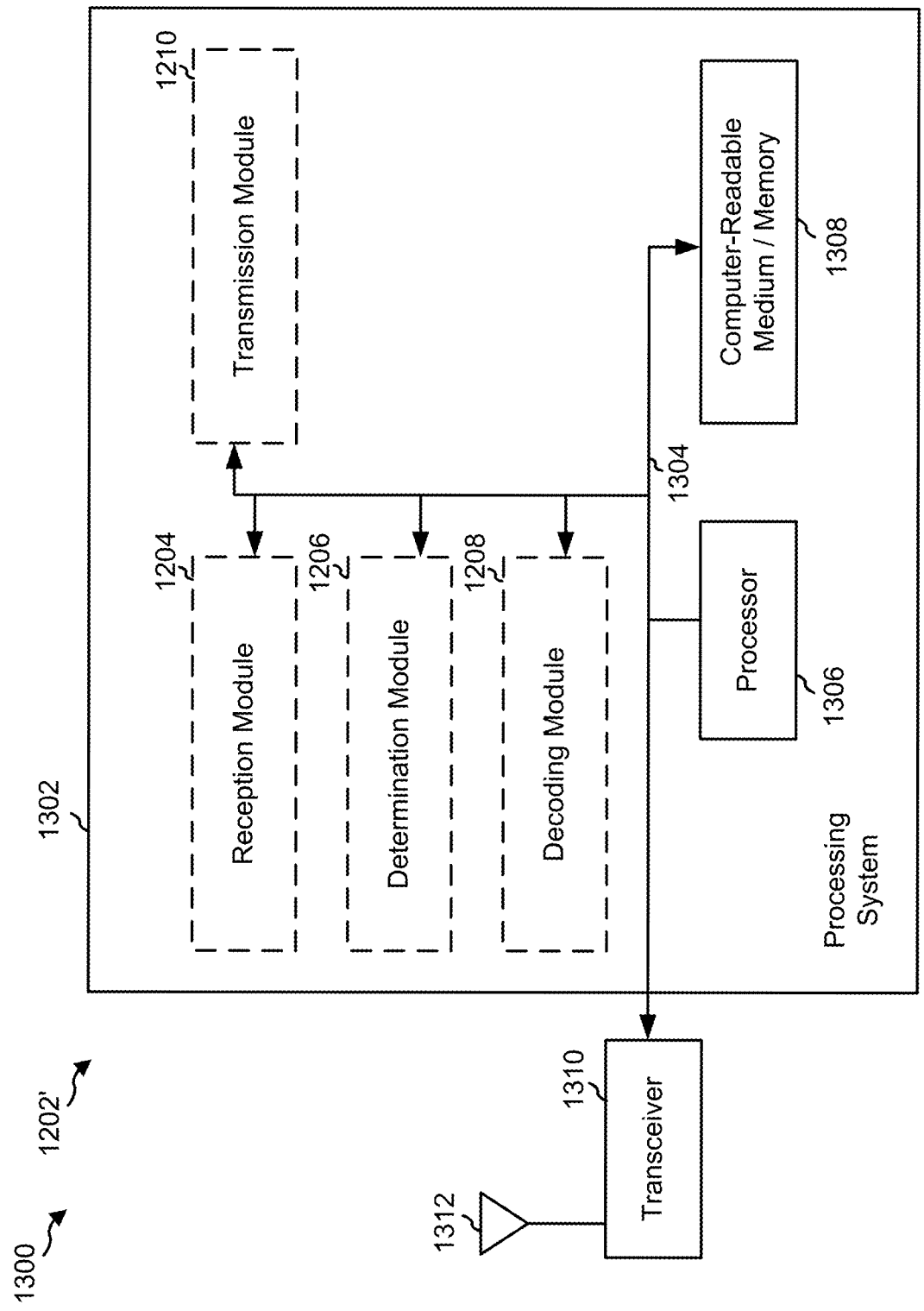
FIG. 13 is a diagram illustrating another example of a hardware implementation for an apparatus employing a processing system.

FIG. 13 is a diagram 1300 illustrating an example of a hardware implementation for an apparatus 1202' employing a processing system 1302. The apparatus 1202' may be a base station The processing system 1302 may be implemented with a bus architecture, represented generally by the bus 1304. The bus 1304 may include any number of interconnecting buses and bridges depending on the specific application of the processing system 1302 and the overall design constraints. The bus 1304 links together various circuits including one or more processors and/or hardware modules, represented by the processor 1306, the modules 1204, 1206, 1208, and/or 1210, and the computer-readable medium/memory 1308. The bus 1304 may also link various other circuits such as timing sources, peripherals, voltage regulators, and power management circuits, which are well known in the art, and therefore, will not be described any further.

The processing system 1302 may be coupled to a transceiver 1310. The transceiver 1310 is coupled to one or more antennas 1312. The transceiver 1310 provides a means for communicating with various other apparatus over a transmission medium. The transceiver 1310 receives a signal from the one or more antennas 1312, extracts information from the received signal, and provides the extracted information to the processing system 1302, specifically the reception module 1204. In addition, the transceiver 1310 receives information from the processing system 1302, specifically the transmission module 1210, and based at least in part on the received information, generates a signal to be applied to the one or more antennas 1312. The processing system 1302 includes a processor 1306 coupled to a computer-readable medium/memory 1308. The processor 1306 is responsible for general processing, including the execution of software stored on the computer-readable medium/memory 1308. The software, when executed by the processor 1306, causes the processing system 1302 to perform the various functions described supra for any particular apparatus. The computer-readable medium/memory 1308 may also be used for storing data that is manipulated by the processor 1306 when executing software. The processing system further includes at least one of the modules 1204, 1206, 1208, and/or 1210. The modules may be software modules running in the processor 1306, resident/stored in the computer readable medium/memory 1308, one or more hardware modules coupled to the processor 1306, or some combination thereof. The processing system 1302 may be a component of the base station 110 and may include the memory 242 and/or at least one of the TX MIMO processor 230, the RX processor 238, and/or the controller/processor 240.

In some aspects, the apparatus 1202/1202' for wireless communication includes means for receiving a reference signal that indicates whether ACK/NACK signaling is present in an uplink transmission in a portion of uplink resources allocated for a data channel, means for determining whether the ACK/NACK signaling was received in the uplink transmission based at least in part on the reference signal, means for decoding the ACK/NACK signaling when the ACK/NACK signaling is received, means for decoding uplink data in the uplink transmission based at least in part on whether the ACK/NACK signaling was received, and/or the like. The aforementioned means may be one or more of the aforementioned modules of the apparatus 1202 and/or the processing system 1302 of the apparatus 1202' configured to perform the functions recited by the aforementioned means. As described supra, the processing system 1302 may include the TX MIMO processor 230, the receive processor 238, and/or the controller/processor 240. As such, in one configuration, the aforementioned means may be the TX MIMO processor 230, the receive processor 238, and/or the controller/processor 240 configured to perform the functions recited by the aforementioned means.

FIG. 13 is provided as an example. Other examples are possible and may differ from what was described in connection with FIG. 13.

It is understood that the specific order or hierarchy of blocks in the processes/flow charts disclosed is an illustration of example approaches. Based upon design preferences, it is understood that the specific order or hierarchy of blocks in the processes/flow charts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of wireless communication, comprising:
   determining, by a user equipment (UE), whether acknowledgement or negative acknowledgement (ACK/NACK) signaling is to be included in an uplink transmission in a portion of uplink resources allocated for a data channel;
   generating, by the UE, a reference signal that indicates whether the ACK/NACK signaling is present in the uplink transmission, wherein a single symbol of the reference signal indicates whether the ACK/NACK signaling is present in the uplink transmission, and wherein a cyclic shift, of a plurality of cyclic shifts, applied to the single symbol indicates whether the ACK/NACK signaling is present or not present in the uplink transmission; and
   transmitting, by the UE, the reference signal that indicates whether the ACK/NACK signaling is present in the uplink transmission.

2. The method of claim 1, wherein the reference signal is modulated to indicate whether the ACK/NACK signaling is present in the uplink transmission.

3. The method of claim 1, wherein the reference signal is a demodulation reference signal.

4. The method of claim 1, wherein the reference signal indicates whether uplink data is rate matched around the ACK/NACK signaling in the uplink transmission.

5. The method of claim 1, wherein the reference signal indicates whether uplink data is punctured by the ACK/NACK signaling in the uplink transmission.

6. The method of claim 1, wherein a payload size of the ACK/NACK signaling is indicated using one or more dedicated resource elements.

7. The method of claim 1, wherein the portion of uplink resources allocated for the data channel is a physical uplink shared channel.

8. The method of claim 1, wherein the cyclic shift is associated with a value that is equal to a length of a sequence of the single symbol divided by two.

9. The method of claim 8, wherein the value being equal to the length of the sequence divided by two indicates that the ACK/NACK signaling is not present in the uplink transmission.

10. The method of claim 1, wherein the cyclic shift is associated with a value that is equal to zero when the ACK/NACK signaling is present in the uplink transmission.

11. A user equipment (UE) for wireless communication, comprising:
    memory; and
    one or more processors operatively coupled to the memory, the memory and the one or more processors configured to:
      determine whether acknowledgement or negative acknowledgement (ACK/NACK) signaling is to be included in an uplink transmission in a portion of uplink resources allocated for a data channel;
      generate a reference signal that indicates whether the ACK/NACK signaling is present in the uplink transmission, wherein a single symbol of the reference signal indicates whether the ACK/NACK signaling is present in the uplink transmission, and wherein a cyclic shift, of a plurality of cyclic shifts, applied to the single symbol indicates whether the ACK/NACK signaling is present or not present in the uplink transmission; and
      transmit the reference signal that indicates whether the ACK/NACK signaling is present in the uplink transmission.

12. The UE of claim 11, wherein the reference signal is modulated to indicate whether the ACK/NACK signaling is present in the uplink transmission.

13. The UE of claim 11, wherein the reference signal is a demodulation reference signal.

14. The UE of claim 11, wherein the reference signal indicates whether uplink data is rate matched around the ACK/NACK signaling in the uplink transmission.

15. The UE of claim 11, wherein the reference signal indicates whether uplink data is punctured by the ACK/NACK signaling in the uplink transmission.

16. The UE of claim 11, wherein a payload size of the ACK/NACK signaling is indicated using one or more dedicated resource elements.

17. The UE of claim 11, wherein the portion of uplink resources allocated for the data channel is a physical uplink shared channel.

18. The UE of claim 11, wherein the cyclic shift is associated with a value that is equal to a length of a sequence of the single symbol divided by two when the ACK/NACK signaling is present in the uplink transmission.

19. A method of wireless communication, comprising:
    receiving, by a base station, a reference signal that indicates whether acknowledgement or negative acknowledgement (ACK/NACK) signaling is present in an uplink transmission in a portion of uplink resources allocated for a data channel, wherein a single symbol of the reference signal indicates whether the ACK/NACK signaling is present in the uplink transmission, and wherein a cyclic shift, of a plurality of cyclic shifts, applied to the single symbol indicates whether the ACK/NACK signaling is present or not present in the uplink transmission;

determining, by the base station, whether the ACK/NACK signaling was received in the uplink transmission based at least in part on the reference signal; and decoding, by the base station, the ACK/NACK signaling when the ACK/NACK signaling is received.

20. The method of claim 19, wherein uplink data in the uplink transmission is decoded based at least in part on whether the ACK/NACK signaling was received.

21. The method of claim 20, wherein, when the ACK/NACK signaling is received, the uplink data is decoded from a set of resource elements other than resource elements in which the ACK/NACK signaling is received.

22. The method of claim 20, wherein a set of resource elements are decoded as the ACK/NACK signaling or uplink data based at least in part on the indication in the reference signal.

23. The method of claim 19, wherein the reference signal is a demodulation reference signal.

24. The method of claim 19, wherein the single symbol is a DMRS sequence.

25. The method of claim 19, wherein the cyclic shift is associated with a value that is equal to a length of a sequence of the single symbol divided by two.

26. A base station for wireless communication, comprising:

memory; and one or more processors operatively coupled to the memory, the memory and the one or more processors configured to:

receive a reference signal that indicates whether acknowledgement or negative acknowledgement (ACK/NACK) signaling is present in an uplink transmission in a portion of uplink resources allocated for a data channel, wherein a single symbol of the reference signal indicates whether the ACK/NACK signaling is present in the uplink transmission, and wherein a cyclic shift, of a plurality of cyclic shifts, applied to the single symbol indicates whether the ACK/NACK signaling is present or not present in the uplink transmission;

determine whether the ACK/NACK signaling was received in the uplink transmission based at least in part on the reference signal; and decode the ACK/NACK signaling when the ACK/NACK signaling is received.

27. The base station of claim 26, wherein uplink data in the uplink transmission is decoded based at least in part on whether the ACK/NACK signaling was received.

28. The base station of claim 26, wherein the reference signal is a demodulation reference signal.

29. The base station of claim 26, wherein the single symbol is a DMRS sequence.

30. The base station of claim 26, w wherein the cyclic shift is associated with a value that is equal to a length of a sequence of the single symbol divided by two.

* * * * *